(12) United States Patent
Futatsugi et al.

(10) Patent No.: US 8,170,141 B2
(45) Date of Patent: May 1, 2012

(54) TRANSMITTING DEVICE, TRANSMITTING/RECEIVING DEVICE, TRANSMITTING METHOD AND TRANSMITTING/RECEIVING METHOD

(75) Inventors: Yasunori Futatsugi, Tokyo (JP); Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 693 days.

(21) Appl. No.: 12/343,258

(22) Filed: Dec. 23, 2008

(65) Prior Publication Data

US 2009/0168910 A1 Jul. 2, 2009

(30) Foreign Application Priority Data

Dec. 27, 2007 (JP) ................................ 2007-336636

(51) Int. Cl.
*H04B 1/10* (2006.01)
(52) U.S. Cl. ........................................ 375/296; 375/350
(58) Field of Classification Search .................. 375/144, 375/233, 148, 252, 301, 321, 350, 348, 296; 370/320, 335
See application file for complete search history.

(56) References Cited

U.S. PATENT DOCUMENTS

2004/0091057 A1* 5/2004 Yoshida .......................... 375/260
2010/0189162 A1* 7/2010 Yoshimoto et al. ............ 375/141

FOREIGN PATENT DOCUMENTS

JP 2001308763 A 11/2001
JP 2003216190 A 7/2003
JP 2003535493 A 11/2003

OTHER PUBLICATIONS

Priyanto et al., Initial Performance Evaluation of DFT-Spread OFDM Based on SC-FDMA for Utra LTE Uplink, Apr. 2007, IEEE.*
Myung et al, Peak-to-Average Power Ratio of Single Carrier FDMA Signals with Pulse Shaping, Sep. 2006, Personal Indoor and Mobile Radio communication IEEE.*
Akinori Nakajima et al., "Iterative Frequency-domain Interference Cancellation of Inter-code Interference and Inter-antenna Interference", Technical Report of IEICE RCS, vol. 106, No. 555, (Mar. 2007), pp. 61-64.
Yasunori Futatsugi et al., Iterative Frequency Domain Equalization of MIMO Multiplexing in Uplink Single-Carrier FDMA, IEICE Society Conference, B-5-55, (Sep. 10-14, 2007), p. 377.

* cited by examiner

*Primary Examiner* — David C. Payne
*Assistant Examiner* — Wendel Cadeau

(57) ABSTRACT

A transmitting device according to the present invention comprises: a coding unit which encodes a transmission information bit string to a code bit string; a low-order modulating unit which conducts low-order modulation on the code bit string outputted from the encoding unit; a first frequency domain converting unit which converts the low-order modulated signal outputted from the low-order modulating unit to a frequency domain signal; a partial spectrum selecting unit which selects a central 1/M portion (M is an integer greater than or equal to two) of a spectrum from the frequency spectrum outputted from the first frequency domain converting unit; and a first time domain converting unit which converts the spectrum selected signal outputted from the partial spectrum selecting unit to a time domain signal.

18 Claims, 18 Drawing Sheets

TRANSMITTING DEVICE, TRANSMITTING/RECEIVING DEVICE, TRANSMITTING METHOD AND TRANSMITTING/RECEIVING METHOD

This application is based upon and claims the benefit of priority from Japanese patent application No. 2007-336636, filed on Dec. 27, 2007, the disclosure of which is incorporated herein in its entirety by reference.

BACKGROUND OF THE INVENTION

1. Field of the Invention

The present invention relates to a radio transmission technique, particularly to a technique of radio-transmitting a single-carrier signal.

2. Description of the Related Art

With respect to uplink communications in next generation mobile communications, it is essential that high transmission power efficiency is achieved at a terminal side. Therefore, a single-carrier (SC) transmission system, where the peak to average power ratio (PAPR) is small, is adopted as a radio access scheme for the uplink communications.

Furthermore, in packet communications, adaptive modulation and channel coding (AMC), where the modulation scheme is to be selected based on a SINR (signal to interference and noise power ratio) of a reception signal, is adopted. For instance, in a good SINR environment, high-order modulation (QAM (quadrature amplitude modulation)) is adopted for transmitting data at high speed.

However, conducting data transmission using a single-carrier signal is often accompanied by a problem of inter-symbol interference (multipath interference) due to multipath. In particular, in a case of using high-order modulation, the problem of deterioration in the receiving characteristics becomes conspicuous.

As a receiving device for preventing such multipath interference, the kind of receiving device that generates a multipath interference replica using a signal after demodulation in order to cancel multipath components in a frequency domain has been considered (Nakajima, A., and Adachi, F. (March, 2007) "Iterative Frequency-domain Interference Cancellation of Inter-code Interference and Inter-antenna Interference", Technical report of IEICE RCS, Vol. 106, No. 555, pp. 61-64).

Furthermore, for the same purpose, the kind of receiving device that generates a multipath interference replica from a soft-bit replica after decoding has been considered (Futatsugi, Y., and Yoshida, S. (2007) "Iterative Frequency Domain Equalization for MIMO Multiplexing in Uplink Single-Carrier FDMA", 2007 IEICE Society Conference, B-5-55).

Now configurations of related transmitting device and receiving device will be described with reference to FIG. 1 and FIG. 2, respectively.

The transmitting device shown in FIG. 1 is to generate a transmission signal by encoding and modulating a transmission information bit string, converting the modulated bit string to a frequency domain signal, conducting sub-carrier mapping, and then restoring the signal to a time domain signal.

The transmitting device includes coding unit 1601, modulating unit 1602, frequency domain converting unit 1603, sub-carrier mapping unit 1604, and time domain converting unit 1605.

Coding unit 1601 is to receive an input of a transmission information bit string and encode the inputted transmission information bit string. Moreover, coding unit 1601 is to output the encoded signal to modulating unit 1602.

Modulating unit 1602 is to modulate the encoded bit string supplied from coding unit 1601. Moreover, modulating unit 1602 is to output the modulated signal to frequency domain converting unit 1603.

Frequency domain converting unit 1603 is to convert the modulated signal supplied from modulating unit 1602 from a time domain signal to a frequency domain signal. Moreover, frequency domain converting unit 1603 is to output the frequency domain signal, obtained by the conversion, to sub-carrier mapping unit 1604.

Sub-carrier mapping unit 1604 is to map the frequency domain signal supplied from frequency domain converting unit 1603 on a predetermined sub-carrier to be transmitted. Moreover, sub-carrier mapping unit 1604 is to output the sub-carrier mapped signal to time domain converting unit 1605.

Time domain converting unit 1605 is to receive the sub-carrier-mapped signal supplied from sub-carrier mapping unit 1604 and convert the sub-carrier-mapped signal from the frequency domain signal to a time domain signal to output a modulated signal.

On the other hand, the receiving device shown in FIG. 2 is to conduct channel estimation and equalization processes on a reception signal by frequency domain processing, and conduct demodulation and decoding after having the signal restored to the time domain signal. Furthermore, the receiving device will generate a residual multipath interference replica based on the decoding result, and cancel the residual multipath interference replica from the equalized signal.

The receiving device includes frequency domain converting unit 1701, sub-carrier demapping unit 1702, channel estimation unit 1703, iterative equalization unit 1704, time domain converting unit 1705, decoding/replica generating unit 1706, and frequency domain converting unit 1707.

Frequency domain converting unit 1701 is to receive an input of a reception signal and convert the signal from a time domain signal to a frequency domain signal. Moreover, frequency domain converting unit 1701 is to output the frequency domain signal, obtained by the conversion, to sub-carrier demapping unit 1702.

Sub-carrier demapping unit 1702 is to receive the frequency domain reception signal supplied from the frequency domain converting unit 1701 and conduct sub-carrier demapping of the signal, which selects a desired sub-carrier. Moreover, sub-carrier demapping unit 1702 is to output the sub-carrier demapped signal to channel estimation unit 1703 and to iterative equalization unit 1704.

Channel estimation unit 1703 is to receive the frequency domain reference reception signal supplied from sub-carrier demapping unit 1702 and calculate a channel estimation value based on reference correlation. Moreover, channel estimation unit 1703 is to output the calculated channel estimation value to iterative equalization unit 1704.

Iterative equalization unit 1704 is to receive the frequency domain reception signal supplied from sub-carrier demapping unit 1702, the channel estimation value supplied from channel estimation unit 1703, and a symbol replica supplied from frequency domain converting unit 1707, the symbol replica having been generated based on the previous decoding result. Iterative equalization unit 1704 is to equalize the reception signal based on the channel estimation value, and along with that, cancel residual multipath interference from the equalized signal using the symbol replica. Moreover, iterative equalization unit 1704 is to output the equalized signal, having the interference cancelled, to time domain converting unit 1705.

Time domain converting unit 1705 is to receive the equalized signal, having the interference cancelled, supplied from iterative equalization unit 1704, and convert the signal from the frequency domain signal to a time domain signal. Moreover, time domain converting unit 1705 is to output the time domain signal, obtained by the conversion, to decoding/replica generating unit 1706.

Decoding/replica generating unit 1706 is to receive the time domain equalized signal supplied from time domain converting unit 1705 and conduct a decoding process on the signal. Moreover, decoding/replica generating unit 1706 is to generate a symbol replica based on a log likelihood ratio with respect to the decoded information bit and the parity bit, and output the generated symbol replica to frequency domain converting unit 1707.

Frequency domain converting unit 1707 is to receive the symbol replica supplied from decoding/replica generating unit 1706 and convert the symbol replica from the time domain signal to a frequency domain signal. Moreover, frequency domain converting unit 1707 is to output the frequency domain signal, obtained by the conversion, to iterative equalization unit 1704.

Next, a detailed configuration of iterative equalization unit 1704 shown in FIG. 2 will be described with reference to FIG. 3.

Iterative equalization unit 1704 shown in FIG. 3 is to carry out equalization weight generating process and equalization filtering process based on the channel estimation value, and cancel the residual multipath interference from the equalized signal using the symbol replica generated based on the previous decoding result.

Iterative equalization unit 1704 includes equalization filter 1801, equalization weight calculation unit 1802, post-equalization channel gain generating unit 1803, equalization desired component generating unit 1804, residual multipath interference replica generating unit 1805, and residual multipath interference cancellation unit 1806.

Equalization filter 1801 is to receive the sub-carrier demapped reception signal supplied from sub-carrier demapping unit 1702 and an equalization weight supplied from equalization weight calculation unit 1802, and equalize the reception signal based on the equalization weight by frequency domain processing. Moreover, equalization filter 1801 is to output the equalized signal to residual multipath interference cancellation unit 1806.

Equalized weight calculation unit 1802 is to receive the channel estimation value supplied from channel estimation unit 1703 and calculate the equalization weight. Moreover, equalization weight calculation unit 1802 is to output the calculated equalization weight to equalization filter 1801 and to post-equalization channel gain generating unit 1803.

Post-equalization channel gain generating unit 1803 is to receive the channel estimation value supplied from channel estimation unit 1703 and the equalization weight supplied from equalization weight calculation unit 1802, and generate a post-equalization channel gain. Moreover, post-equalization channel gain generating unit 1803 is to output the generated post-equalization channel gain to equalization desired component generating unit 1804 and to residual multipath interference replica generating unit 1805.

Equalization desired component generating unit 1804 is to receive the post-equalization channel gain supplied from post-equalization channel gain generating unit 1803 and calculate an equalization desired component which is being an average value of the post-equalization channel gains. Moreover, equalization desired component generating unit 1804 is to output the calculated equalization desired component to residual multipath interference replica generating unit 1805.

Residual multipath interference replica generating unit 1805 is to receive the post-equalization channel gain supplied from post-equalization channel gain generating unit 1803, the equalization desired component supplied from equalization desired component generating unit 1804 and the symbol replica supplied from frequency domain converting unit 1707, the symbol replica having been generated based on the previous decoding result, and generate a residual multipath interference replica. Moreover, residual multipath interference replica generating unit 1805 is to output the generated residual multipath interference replica to residual multipath interference cancellation unit 1806.

Residual multipath interference cancellation unit 1806 is to receive the equalized signal supplied from equalization filter 1801 and the residual multipath interference replica supplied from residual multipath interference replica generating unit 1805, and cancel interference by subtracting the residual multipath interference replica from the equalized signal. Moreover, residual multipath interference cancellation unit 1806 is to output the equalized signal, with the interference being cancelled, to time domain converting unit 1705.

The equalized signal, after having the interference has been cancelled, with sub-carrier "k" (k=1, 2, ..., K (K is an integer greater than or equal to two, and indicates the number of sub-carriers)) and iteration count "i" (i=1, 2, ...) can be represented by the following equation.

$$\hat{R}^{(i)}(k) = W^{(i)}(k)R(k) - \left(W^{(i)}(k)H(k) - \tilde{H}\right)\hat{S}^{(i-1)}(k) \quad \text{[Equation 1]}$$

$$\tilde{H} = \frac{1}{K}\sum_{k=1}^{K} W^{(i)}(k)H(k)$$

$\hat{R}^{(i)}(k)$: equalized signal after interference being cancelled
$W^{(i)}(k)R(k)$: equalized signal
$W^{(i)}(k)H(k)$: post-equalization channel gain
$\tilde{H}$: equalization desired component
$W^{(i)}(k)$: equalization weight considering residual interference power
$R(k)$: reception signal
$H(k)$: channel estimation value
$\hat{S}^{(i-1)}(k)$: post-decoding symbol replica As described above, with respect to the related transmitting/receiving device, in the case where the adaptive modulation and channel coding (AMC) is adopted, high-order modulation (QAM modulation) will be selected when the SINR is high.

With the QAM modulation, however, as compared to low-order modulation such as PSK (phase shift keying) modulation, etc., the number of signal points will increase, whereby an inter-signal point distance will become shorter, leading to deterioration in the reception characteristic.

Particularly, with respect to the QAM transmission characteristic of a single-carrier signal in multipath propagation, residual multipath interference cannot be cancelled completely even with the use of the post-decoding replica, leading to deterioration in the characteristics.

In this way, with respect to the related transmitting/receiving device, realizing high-speed radio transmission with a good transmission characteristic of a single-carrier signal in multipath propagation remains as a significant issue.

SUMMARY OF THE INVENTION

It is therefore an object of the present invention to provide a transmitting device, a transmitting/receiving device, a transmitting method and a transmitting/receiving method which are capable of resolving the above-described problems.

A transmitting device according to the present invention is a transmitting device which transmits a single-carrier signal, comprising: a coding unit which encodes a transmission information bit string and outputs the encoded transmission information bit string as a code bit string; a low-order modulating unit which conducts low-order modulation on the code bit string outputted from the encoding unit and outputs the low-order modulated code bit string as a low-order modulated signal; a first frequency domain converting unit which converts the low-order modulated signal outputted from the low-order modulating unit to a frequency domain signal and outputs the converted low-order modulated signal as a frequency spectrum; a partial spectrum selecting unit which selects a central 1/M portion (M is an integer greater than or equal to two) of a spectrum from the frequency spectrum outputted from the first frequency domain converting unit and outputs a spectrum selected signal; and a first time domain converting unit which converts the spectrum selected signal outputted from the partial spectrum selecting unit to a time domain signal and outputs the converted spectrum selected signal as a transmission signal.

A transmitting/receiving device according to the present invention is a transmitting/receiving device which transmits a single-carrier signal, comprising: a transmitting device including a coding unit which encodes a transmission information bit string and outputs the encoded transmission information bit string as a code bit string, a low-order modulating unit which conducts low-order modulation on the code bit string outputted from the encoding unit and outputs the low-order modulated code bit string as a low-order modulated signal, a first frequency domain converting unit which converts the low-order modulated signal outputted from the low-order modulating unit to a frequency domain signal and outputs the converted low-order modulated signal as a frequency spectrum, a partial spectrum selecting unit which selects a central 1/M portion (M is an integer greater than or equal to two) of a spectrum from the frequency spectrum outputted from the first frequency domain converting unit and outputs a spectrum selected signal, and a first time domain converting unit which converts the spectrum selected signal outputted from the partial spectrum selecting unit to a time domain signal and outputs the converted spectrum selected signal as a transmission signal; and a receiving device including a second frequency domain converting unit which converts a reception signal to a frequency domain signal, and outputs the converted reception signal as a reception signal including a reference reception signal, a channel estimation unit which conducts channel estimation on the basis of the frequency domain reference reception signal outputted from the second frequency domain converting unit and outputs a channel estimation value, an iterative equalization unit which equalizes the frequency domain reception signal outputted from the second frequency domain converting unit using the channel estimation value outputted from the channel estimation unit, iteratively cancels inter-symbol interference from the equalized signal using a frequency domain symbol replica and outputs the signal as an interference cancelled signal, a second time domain converting unit which converts the interference cancelled signal outputted from the iterative equalization unit to a time domain interference cancelled signal and outputs the time domain interference cancelled signal, a decoding/replica generating unit which decodes the time domain interference cancelled signal outputted from the second time domain converting unit, generates a symbol replica based on the decoding result and outputs the generated symbol replica, and a third frequency domain converting unit which converts the symbol replica outputted from the decoding/replica generating unit to a frequency domain signal and outputs the frequency domain signal of the symbol replica to the iterative equalization unit.

A first transmitting method according to the present invention is a transmitting method of transmitting a single-carrier signal, comprising: encoding a transmission information bit string, conducting low-order modulation on the encoded bit string and outputting the encoded and modulated transmission information bit string as a frequency spectrum; and transmitting a partial spectrum that is a central 1/M portion (M is an integer greater than or equal to two) of the Nyquist band-limited frequency spectrum outputted as a result of the encoding and the low-order modulation.

A second transmitting method according to the present invention is a transmitting method of transmitting a single-carrier signal, comprising: encoding a transmission information bit string and outputting the encoded transmission information bit string as a code bit string; conducting low-order modulation on the code bit string outputted as a result of the encoding and outputting the low-order modulated code bit string as a low-order modulated signal; conducting first frequency domain conversion by which the low-order modulated signal outputted as a result of the low-order modulation is converted to a frequency domain signal and outputted as a frequency spectrum; conducting partial spectrum selection by which a central 1/M portion (M is an integer greater than or equal to two) of the frequency spectrum outputted as a result of the first frequency domain conversion is selected and outputted as a spectrum selected signal; and conducting first time domain conversion by which the spectrum selected signal outputted as a result of the partial spectrum selection is converted to a time domain signal and outputted as a transmission signal.

A first transmitting/receiving method according to the present invention is a transmitting/receiving method of transmitting a single-carrier signal, comprising: in transmission, encoding a transmission information bit string, conducting low-order modulation on the encoded bit string and outputting the encoded and modulated transmission information bit string as a frequency spectrum, and transmitting a selected partial spectrum that is a central 1/M portion (M is an integer greater than or equal to two) of the Nyquist band-limited frequency spectrum outputted as a result of the encoding and the low-order modulation; and in reception, conducting iterative equalization on the reception signal, outputted as a result of the partial spectrum selection, by liner filtering and inter-symbol interference cancellation using a replica after decoding.

A second transmitting/receiving method according to the present invention is a transmitting/receiving method of transmitting a single-carrier signal, comprising: in transmission, encoding a transmission information bit string and outputting the encoded transmission information bit string as a code bit string, conducting low-order modulation on the code bit string outputted as a result of the encoding and outputting the low-order modulated code bit string as a low-order modulated signal, conducting first frequency domain conversion by which the low-order modulated signal outputted as a result of the low-order modulation is converted to a frequency domain signal and outputted as a frequency spectrum, conducting partial spectrum selection by which a central 1/M portion (M is an integer greater than or equal to two) of the frequency spectrum outputted as a result of the first frequency domain conversion is selected and outputted as a spectrum selected signal, and conducting first time domain conversion by which the spectrum selected signal outputted as a result of the partial spectrum selection is converted to a time domain signal and outputted as a transmission signal; and in reception, conducting second frequency domain conversion by which a reception signal is converted to a frequency domain signal and outputted as a reception signal including a reference reception signal, conducting channel estimation on the basis of the frequency domain reference reception signal outputted as a result of the second frequency domain conversion and outputting a channel estimation value, conducting iterative equalization by which the frequency domain reception signal outputted as a result of the second frequency domain conversion is equalized using the channel estimation value outputted as a result of the channel estimation, by which inter-symbol interference is iteratively cancelled from the equalized signal using a frequency domain symbol replica and the equalized signal with the inter-symbol interference that is cancelled is outputted as an interference cancelled signal, conducting second time domain conversion by which the interference cancelled signal outputted as a result of the iterative equalization is converted to a time domain interference cancelled signal and outputted, conducting decoding/replica generation by which the time domain interference cancelled signal outputted as a result of the second time domain conversion is decoded, a symbol replica that is generated based on the decoding result and the generated symbol replica that is outputted, and conducing third frequency domain conversion by which the symbol replica outputted as a result of the decoding/replica generation is converted to a frequency domain signal and outputted for the iterative equalization.

According to the present invention, in the transmitting device, by conducting low-order modulation on the information bit string, a partial spectrum is to be transmitted. The spectrum having been lost at the transmitting device is to be restored at the receiving device.

Therefore, high-speed radio transmission having a low transmission error rate of single-carrier signal in multipath propagation, which is an advantageous effect, can be achieved.

The above and other objects, features, and advantages of the present invention will become apparent from the following description with reference to the accompanying drawings which illustrate examples of the present invention.

DESCRIPTION OF THE PREFERRED EMBODIMENTS

Exemplary embodiments will be described in the following with reference to the drawings.

First Exemplary Embodiment

A transmitting/receiving device according to a first exemplary embodiment includes a transmitting device and a receiving device. Configurations of the transmitting device and the receiving device according to the present exemplary embodiment will be described with reference to FIG. 4 and FIG. 5, respectively.

Figure 1:
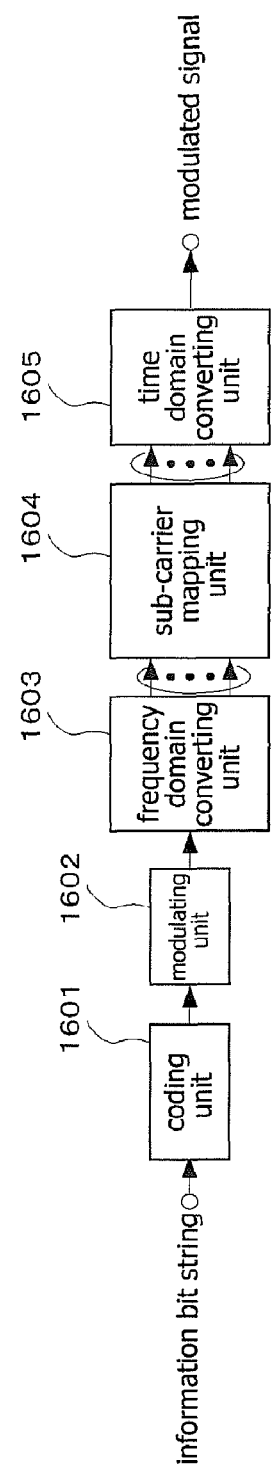
FIG. 1 is a block diagram showing one configuration example of a related transmitting device.
Figure 2:
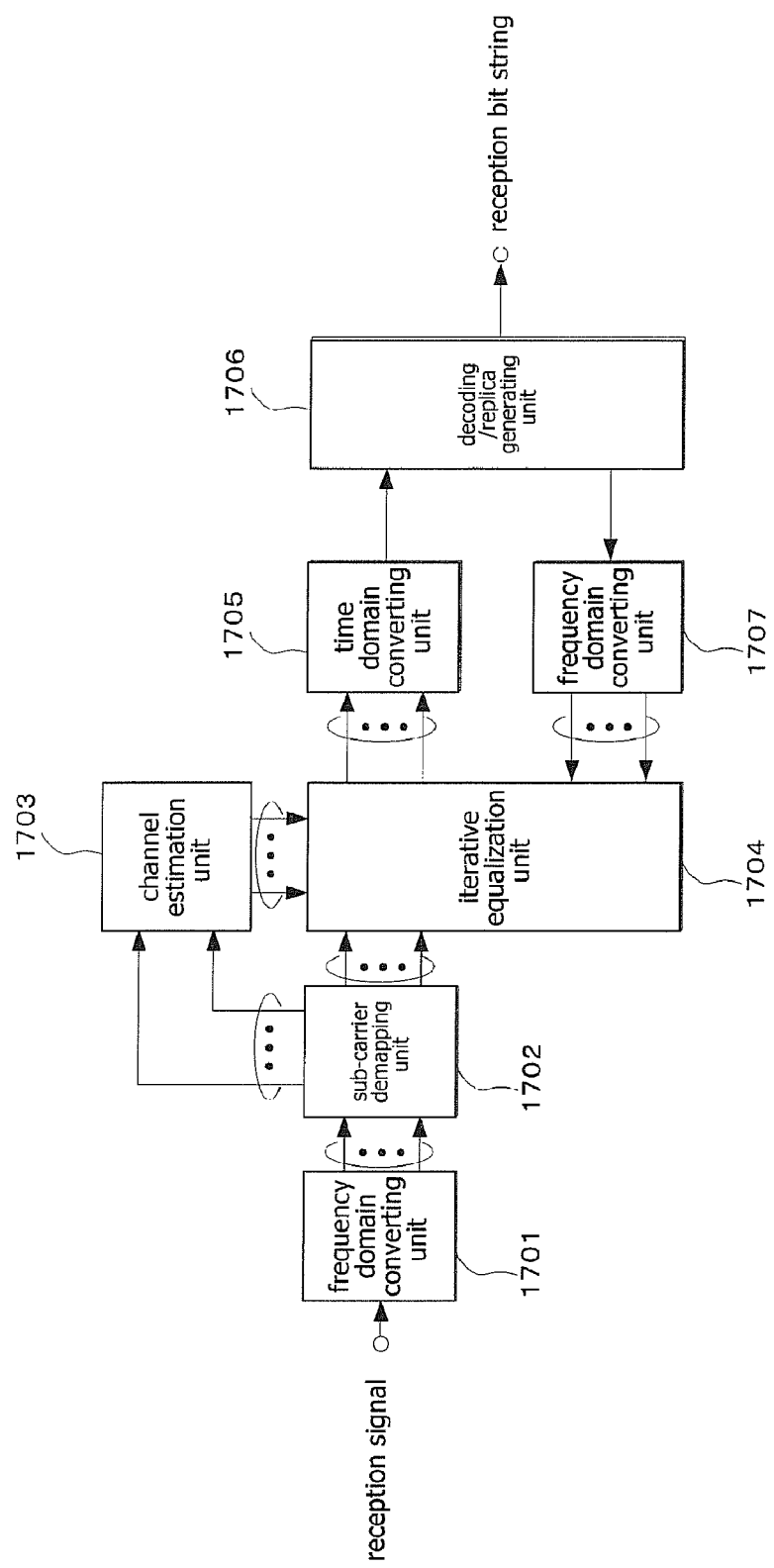
FIG. 2 is a block diagram showing one configuration example of a related receiving device.
Figure 3:
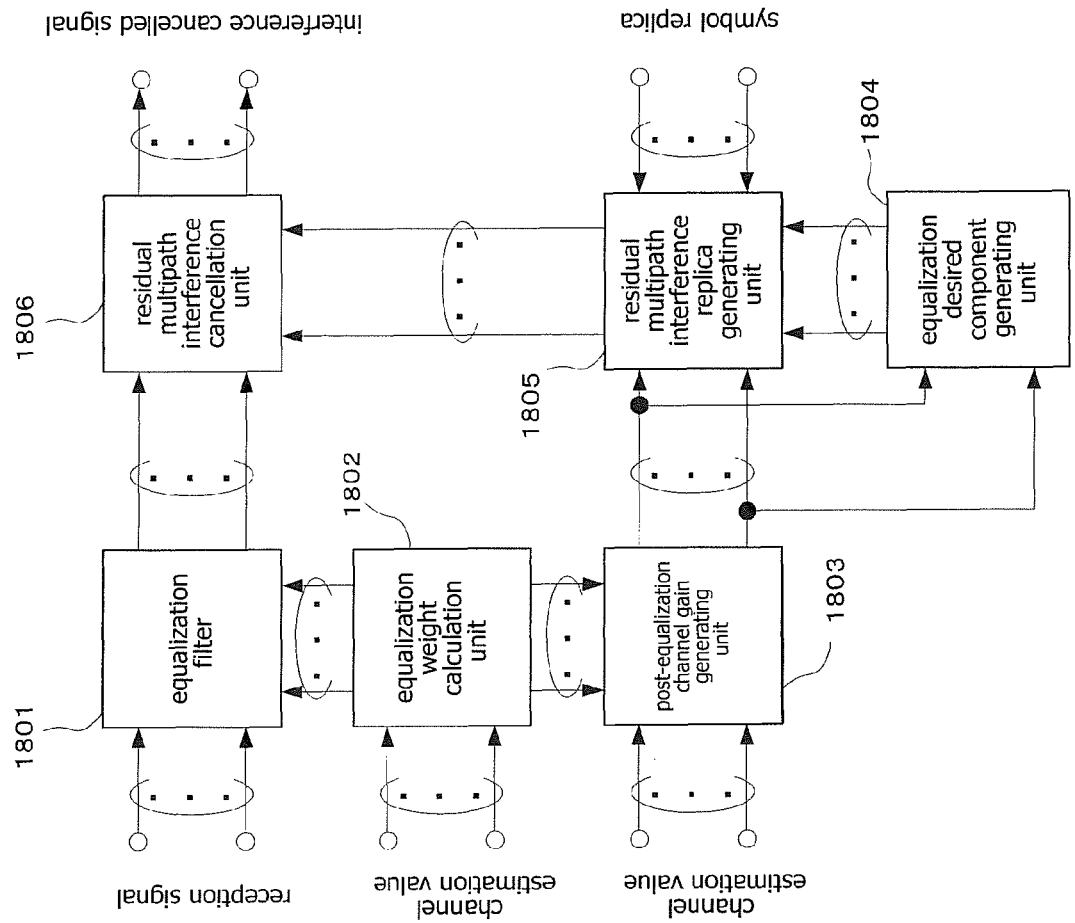
FIG. 3 is a block diagram showing one configuration example of an iterative equalization unit shown in FIG. 2.
Figure 4:
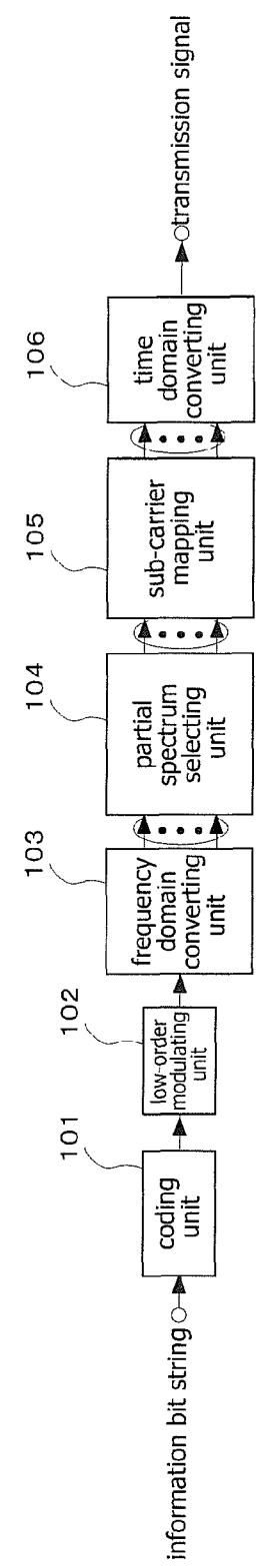
FIG. 4 is a block diagram showing one configuration example of a transmitting device according to a first exemplary embodiment.

The transmitting device shown in FIG. 4 is to generate a transmission signal by encoding and conducting low-order modulation on an information bit string, converting the modulated bit string to a frequency domain signal, conducting partial spectrum selection and sub-carrier mapping, and then converting the signal to a time domain signal.

Figure 5:
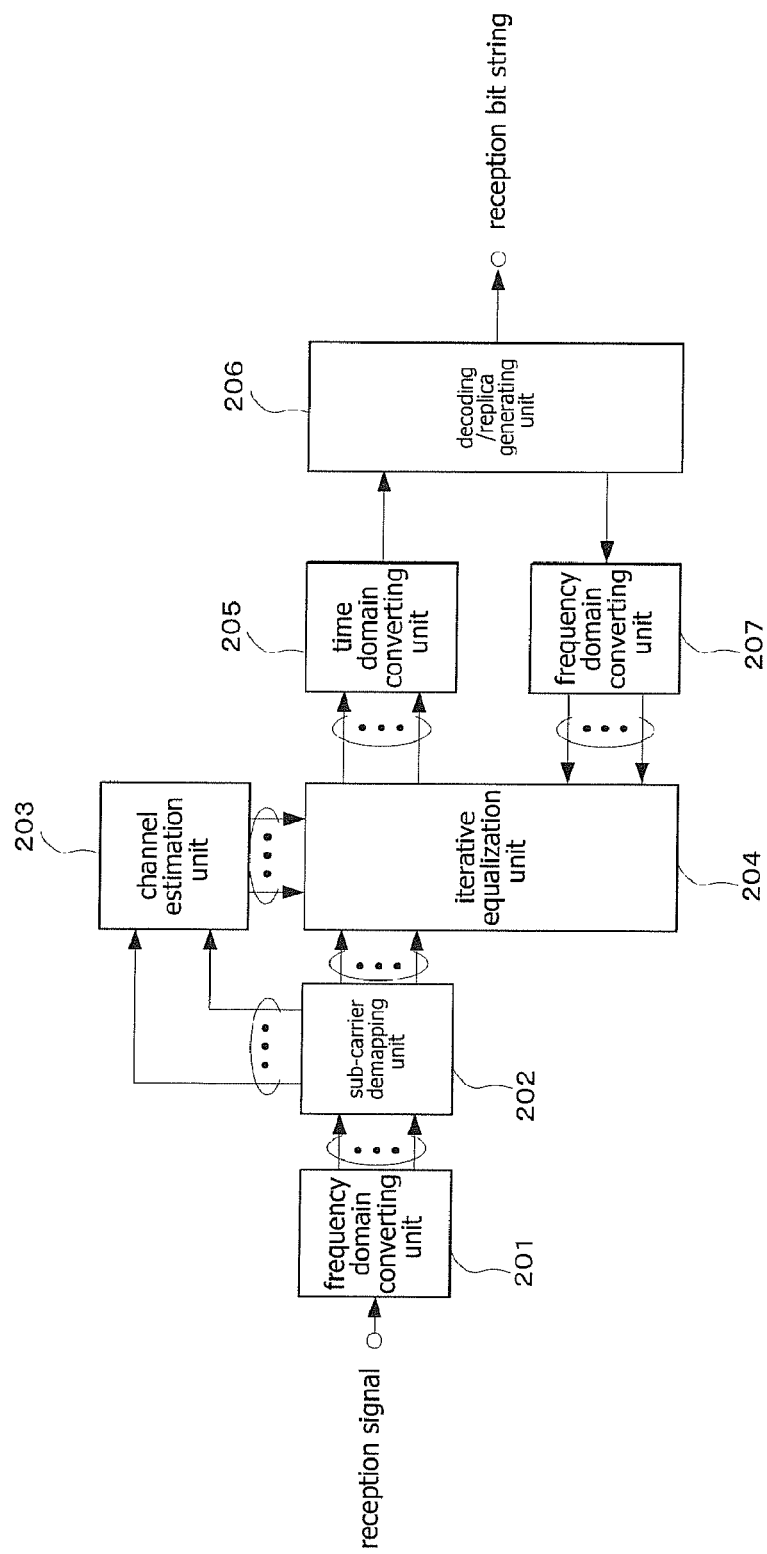
FIG. 5 is a block diagram showing one configuration example of a receiving device according to the first exemplary embodiment.

On the other hand, the receiving device shown in FIG. 5 is to convert a reception signal to a frequency domain signal, conduct channel estimation and equalization on the reception signal by frequency domain processing, and conduct decoding after converting the equalized signal to a time domain signal. Furthermore, the receiving device will generate a frequency domain symbol replica based on the decoding result, and cancel an interference replica attributed to partial spectrum selection by iterative equalization.

The transmitting device shown in FIG. 4 includes coding unit 101, low-order modulation unit 102, frequency domain converting unit 103, partial spectrum selecting unit 104, sub-carrier mapping unit 105, and time domain converting unit 106.

Coding unit 101 is to receive an input of a transmission information bit string and encode the inputted transmission information bit string. In the encoding, a convolution code or a turbo code, etc. is to be used in common. Moreover, coding unit 101 is to output the encoded bit string to low-order modulation unit 102.

Low-order modulation unit 102 is to conduct low-order modulation (PSK modulation, for instance) on the encoded bit string supplied from coding unit 101. Moreover, low-order modulation unit 102 is to output the signal, having gone through the low-order modulation, to frequency domain converting unit 103.

Frequency domain converting unit 103 is to convert the modulated signal supplied from low-order modulation unit 102 from a time domain signal to a frequency domain signal. In the frequency domain conversion, discrete Fourier transform (DFT) or fast Fourier transform (FFT), etc. is to be used in common. Moreover, frequency domain converting unit 103 is to output the frequency domain signal, obtained by the conversion, to partial spectrum selecting unit 104.

Partial spectrum selecting unit 104 is to select a central 1/M portion (M is an integer greater than or equal to two, and indicates a partial spectrum selectivity index) of spectrum of the frequency domain signal (i.e. Nyquist band-limited frequency spectrum) supplied from frequency domain converting unit 103, and outputs the signal to sub-carrier mapping unit 105.

Sub-carrier mapping unit 105 is to receive a signal supplied from partial spectrum selecting unit 104, the signal having gone through the frequency domain partial spectrum selection, and map the signal on a predetermined sub-carrier to be transmitted. Moreover, sub-carrier mapping unit 105 is to output the sub-carrier mapped signal to time domain converting unit 106.

Time domain converting unit 106 is to convert the signal, having gone through the partial spectrum selection, supplied from sub-carrier mapping unit 105, from the frequency domain signal to a time domain signal, and output the time domain signal. In the time domain conversion, inverse discrete Fourier transform (IDFT) or inverse fast Fourier transform (IFFT), etc. is to be used in common.

The receiving device shown in FIG. 5 includes frequency domain converting unit 201, sub-carrier demapping unit 202, channel estimation unit 203, iterative equalization unit 204, time domain converting unit 205, decoding/replica generating unit 206, and frequency domain converting unit 207.

Frequency domain converting unit 201 is to receive an input of a reception signal and convert the signal from a time domain signal to a frequency domain signal. Moreover, frequency domain converting unit 201 is to output the frequency domain signal, obtained by the conversion, to sub-carrier demapping unit 202.

Sub-carrier demapping unit 202 is to receive the frequency domain reception signal supplied from the frequency domain converting unit 201 and conduct sub-carrier demapping of the signal, which selects a desired sub-carrier. Moreover, sub-carrier demapping unit 202 is to output the sub-carrier demapped signal to channel estimation unit 203 and to iterative equalization unit 204.

Channel estimation unit 203 is to receive the frequency domain reference reception signal supplied from sub-carrier demapping unit 202 and calculate a channel estimation value based on reference correlation. Moreover, channel estimation unit 203 is to output the calculated channel estimation value to iterative equalization unit 204.

Iterative equalization unit 204 is to receive the frequency domain sub-carrier demapped reception signal supplied from sub-carrier demapping unit 202, the channel estimation value supplied from channel estimation unit 203, and a symbol replica supplied from frequency domain converting unit 207, the symbol replica having been generated based on the previous decoding result. Iterative equalization unit 204 is to equalize the reception signal based on the channel estimation value, and along with that, cancel inter-symbol interference, attributed to the partial spectrum selection at the transmitting device, from the equalized signal, using the symbol replica. Moreover, iterative equalization unit 204 is to output the equalized signal, whose the interference has been cancelled, to time domain converting unit 205.

Time domain converting unit 205 is to receive the equalized signal, whose the interference has been cancelled, supplied from iterative equalization unit 204 and convert the signal from the frequency domain signal to a time domain signal. Moreover, time domain converting unit 205 is to output the time domain signal, obtained by the conversion, to decoding/replica generating unit 206.

Decoding/replica generating unit 206 is to receive the time domain signal supplied from time domain converting unit 205, decode the signal, and output the decoded signal. Moreover, decoding/replica generating unit 206 is to generate a symbol replica based on the information bit and the parity bit, that acquired higher reliability due to the decoding, and output the generated symbol replica to frequency domain converting unit 207.

Frequency domain converting unit 207 is to receive the symbol replica supplied from decoding/replica generating unit 206 and convert the symbol replica from the time domain signal to a frequency domain signal. Moreover, frequency domain converting unit 207 is to output the frequency domain symbol replica, obtained by the conversion, to iterative equalization unit 204.

Figure 6:
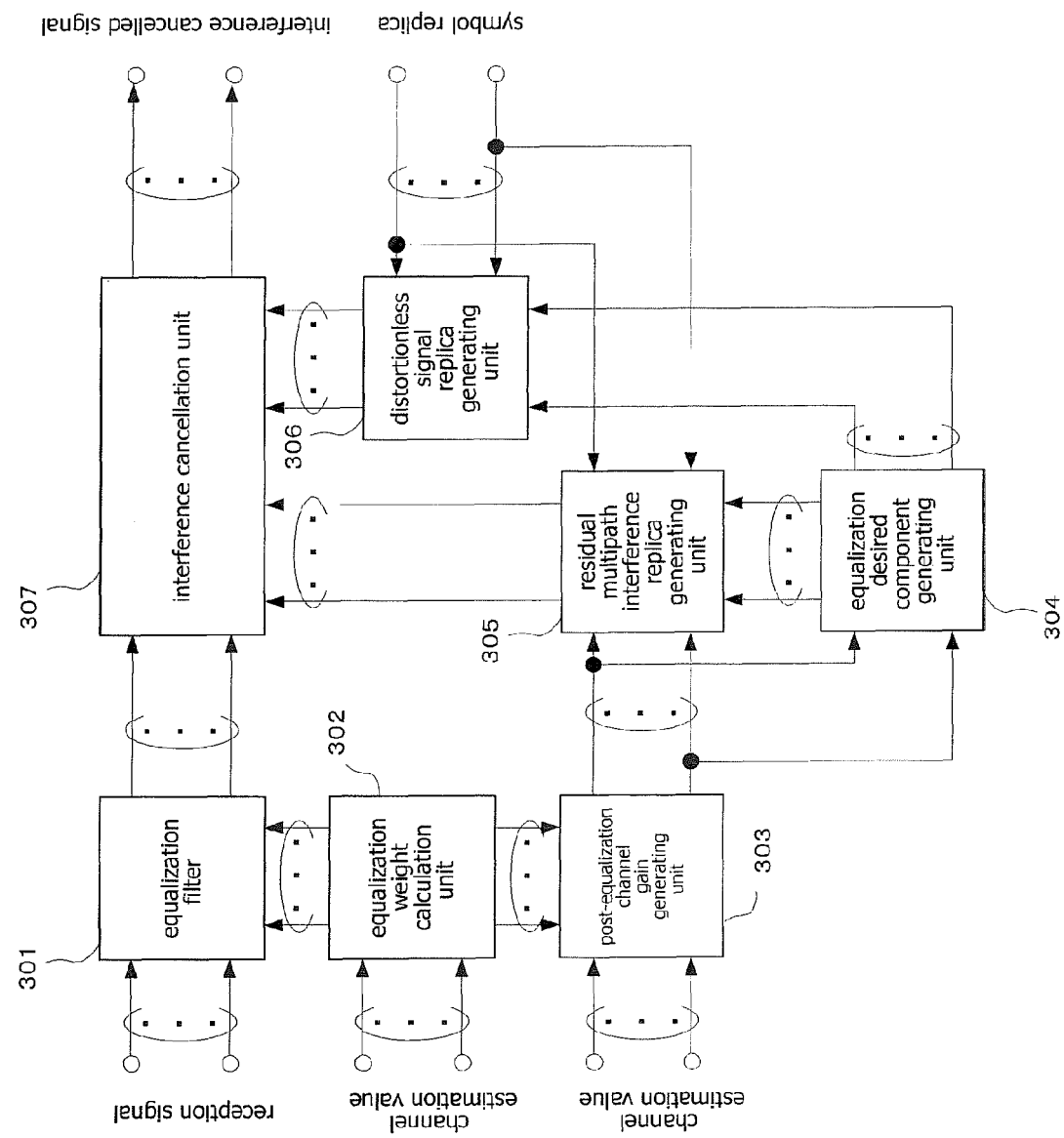
FIG. 6 is a block diagram showing one configuration example of an iterative equalization unit shown in FIG. 5.

Next, a detailed configuration of iterative equalization unit 204 shown in FIG. 5 will be described with reference to FIG. 6.

Iterative equalization unit 204 is to equalize the reception signal, cancel the residual multipath interference, and restore the spectrum having been lost at the transmitting device, by using the symbol replica.

Iterative equalization unit 204 includes equalization filter 301, equalization weight calculation unit 302, post-equalization channel gain generating unit 303, equalization desired component generating unit 304, residual multipath interference replica generating unit 305, distortionless signal replica generating unit 306, and interference cancellation unit 307.

Equalization filter 301 is to receive the sub-carrier demapped frequency domain reception signal supplied from sub-carrier demapping unit 202 and an equalization weight supplied from equalization weight calculation unit 302, and equalize the reception signal based on the equalization weight by frequency domain processing. Moreover, equalization filter 301 is to output the equalized signal to interference cancellation unit 307.

Equalized weight calculation unit 302 is to receive the channel estimation value supplied from channel estimation unit 203 and calculate the equalization weight. With respect to the equalization weight, for example, MMSE (minimum mean square error) weight, etc. is to be used. Moreover, equalization weight calculation unit 302 is to output the calculated equalization weight to equalization filter 301 and to post-equalization channel gain generating unit 303.

Post-equalization channel gain generating unit 303 is to receive the channel estimation value supplied from channel estimation unit 203 and the equalization weight supplied from equalization weight calculation unit 302, and generate a post-equalization channel gain. Moreover, post-equalization channel gain generating unit 303 is to output the generated post-equalization channel gain to equalization desired component generating unit 304 and to residual multipath interference replica generating unit 305.

Equalization desired component generating unit 304 is to receive the post-equalization channel gain supplied from post-equalization channel gain generating unit 303 and calculate an equalization desired component which is being an average value of the post-equalization channel gains. Moreover, equalization desired component generating unit 304 is to output the calculated equalization desired component to residual multipath interference replica generating unit 305 and to distortionless signal replica generating unit 306.

Residual multipath interference replica generating unit 305 is to receive the post-equalization channel gain supplied from post-equalization channel gain generating unit 303, the equalization desired component supplied from equalization desired component generating unit 304 and the symbol replica supplied from frequency domain converting unit 207, the symbol replica having been generated based on the previous decoding result, and generate a residual multipath interference replica. Moreover, residual multipath interference replica generating unit 305 is to output the generated residual multipath interference replica to interference cancellation unit 307.

Distortionless signal replica generating unit 306 is to receive the equalization desired component supplied from equalization desired component generating unit 304 and the symbol replica supplied from frequency domain converting unit 207, the symbol replica having been generated based on the previous decoding result, and generate a distortionless signal replica. Moreover, distortionless signal replica generating unit 306 is to output the generated distortionless signal replica to interference cancellation unit 307.

Interference cancellation unit 307 is to receive the equalized signal supplied from equalization filter 301, the residual multipath interference replica supplied from residual multipath interference replica generating unit 305 and the distortionless signal replica supplied from the distortionless signal replica generating unit 306. With respect to the non-transmission spectrum (sub-carrier), interference cancellation unit 307 is to restore the non-transmission spectrum using the distortionless signal replica. Furthermore, with respect to the equalized signal of the transmitting spectrum, interference cancellation unit 307 is to cancel the residual multipath interference by subtracting the residual multipath interference replica from the equalized signal, and output the equalized signal, with the interference being cancelled, to time domain converting unit 205. The interference cancelled signal, that is, the equalized signal, after the interference has been cancelled, with sub-carrier "k" (k=1, 2, . . . , K (K is an integer greater than or equal to two, and indicates the number of sub-carriers)) and iteration count "i" (i=1, 2, . . . ), can be represented by the following equation.

$$\hat{R}^{(i)}(k) = \begin{cases} W^{(i)}(k)R(k) - \left(W^{(i)}(k)H(k) - \tilde{H}^{(i)}\right)\hat{S}^{(i-1)}(k) \ldots \text{ if "}k\text{" is} \\ \text{tranmission sub-carrier} \\ \tilde{H}^{(i)}\hat{S}^{(i-1)}(k) \ldots \text{ if "}k\text{" is non-tranmission sub-carrier} \end{cases}$$ [Equation 2]

$\hat{R}^{(i)}(k)$: interference cancelled signal
$W^{(i)}(k)R(k)$: equalized signal
$W^{(i)}(k)H(k)$: post-equalization channel gain
$\tilde{H}^{(i)}\hat{S}^{(i-1)}(k)$: distortionless signal replica
$\tilde{H}^{(i)}$: equalization desired component
$W^{(i)}(k)$: equalization weight considering residual interference power R(k): reception signal
$\hat{S}^{(i-1)}(k)$: symbol replica
H(k): channel estimation value The equalization desired component with iteration count "i" can be represented by the following equation.

$$\tilde{H}^{(i)} = \frac{1}{n(K')} \sum_{k' \in K'} W^{(i)}(k')H(k')$$ [Equation 3]

$\tilde{H}^{(i)}$: equalization desired component
k': transmission sub-carrier
K': set of transmission sub-carriers as elements
n(K'): the number of transmission sub-carriers The equalization weight taking into consideration residual interference power, for which MMSE weight is suitable, with sub-carrier "k" and iteration count "i", can be represented by the following equation. A superscript "*" denotes complex conjugate (the same hereinafter).

$$W^{(i)}(k) = \frac{H^*(k)}{|H(k)|^2 g^{(i)} + \sigma^2}$$ [Equation 4]

$W^{(i)}(k)$: equalization weight
$g^{(i)}$: residual interference power coefficient
$\sigma^2$: noise power The residual interference power coefficient can be represented by the following equation.

$$g^{(i)} = 1 - \frac{1}{T}\sum_{t=1}^{T}|\hat{s}^{(i-1)}(t)|^2$$ [Equation 5]

$g^{(i)}$: residual interference power coefficient
t: time domain symbol
$\hat{s}^{(i-1)}(t)$: time domain symbol replica The residual interference power coefficient $g^{(1)}$ equals one in the first equalization. As reliability of the symbol replica increases, the residual interference power coefficient will decrease, and the equalization weight will approach MRC (maximal ratio combining) weight from the MMSE weight.

Figure 7:
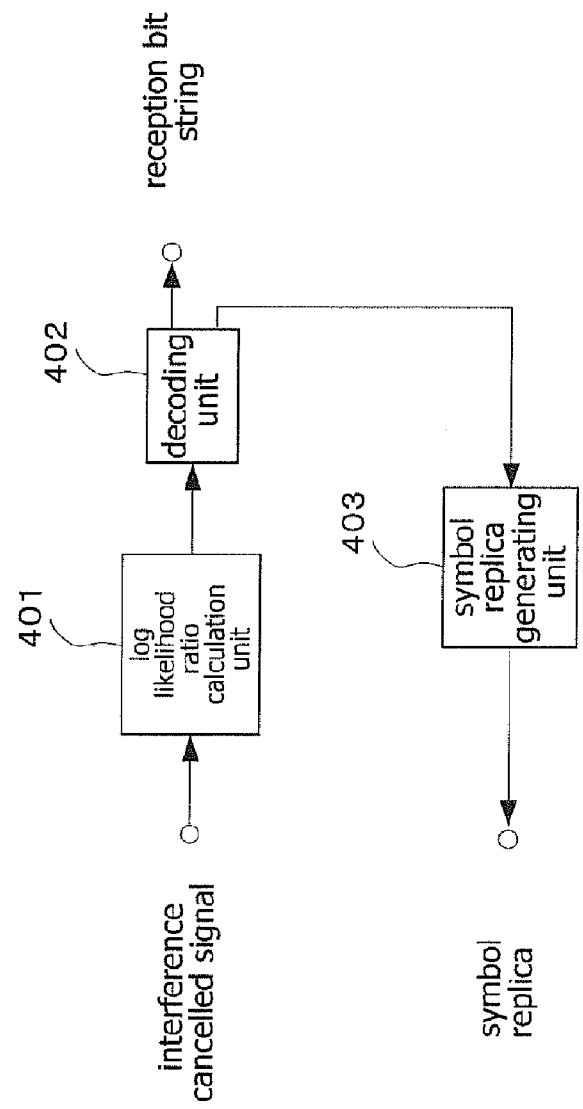
FIG. 7 is a block diagram showing one configuration example of a decoding/replica generating unit shown in FIG. 5.

Next, a detailed configuration of decoding/replica generating unit 206 shown in FIG. 5 will be described with reference to FIG. 7.

Decoding/replica generating unit 206 includes log likelihood ratio calculation unit 401, decoding unit 402, and symbol replica generating unit 403.

Log likelihood ratio calculation unit 401 is to receive the equalized signal, with the interference being cancelled, supplied from time domain converting unit 205, and calculate the log likelihood ratio of each bit. Moreover, log likelihood ratio calculation unit 401 is to output the calculated log likelihood ratio to decoding unit 402.

Decoding unit 402 is to receive the log likelihood ratio of each bit supplied from log likelihood ratio calculation unit 401, and decode and output the log likelihood ratio of each bit. Moreover, decoding unit 402 is to output the information bit and the parity bit, that acquired higher reliability due to the decoding, to symbol replica generating unit 403.

Symbol replica generating unit 403 is to receive the log likelihood ratio of each bit supplied from decoding unit 402, and generate a symbol replica. Moreover, symbol replica generating unit 403 is to output the generated symbol replica to frequency domain converting unit 207.

In a case when QPSK (quadrature phase shift keying) is adopted as the modulation scheme, for example, the symbol replica with iteration count "i−1" and time domain symbol "t" can be represented by the following equation.

$$\hat{s}^{(i-1)}(t) = \frac{1}{\sqrt{2}}\hat{b}^{(i-1)}(2t) + j\frac{1}{\sqrt{2}}\hat{b}^{(i-1)}(2t+1) \quad \text{[Equation 6]}$$

$\hat{s}^{(i-1)}(t)$: symbol replica
$\hat{b}^{(i-1)}(p)$: bit replica of bit p composing symbol Furthermore, in a case when 16 QAM (quadrature amplitude modulation) is adopted as the modulation scheme, for example, the symbol replica can be represented by the following equation.

Furthermore, in a case when 16 QAM (quadrature amplitude modulation) is adopted as the modulation scheme, for example, the symbol replica can be represented by the following equation.

$$\hat{s}^{(i-1)}(t) = \frac{1}{\sqrt{10}}\hat{b}^{(i-1)}(4t)\left(2 - \hat{b}^{(i-1)}(4t+2)\right) + \\ j\frac{1}{\sqrt{10}}\hat{b}^{(i-1)}(4t+1)\left(2 - \hat{b}^{(i-1)}(4t+3)\right) \quad \text{[Equation 7]}$$

$\hat{s}^{(i-1)}(t)$: symbol replica
$\hat{b}^{(i-1)}(p)$: bit replica of bit p composing symbol Here, a bit replica of bit$_p$ can be represented by the following equation.

$$\hat{b}^{(i-1)}(p) = \tanh\left(\frac{b^{(i-1)}(p)}{2}\right) \quad \text{[Equation 8]}$$

Figure 8:
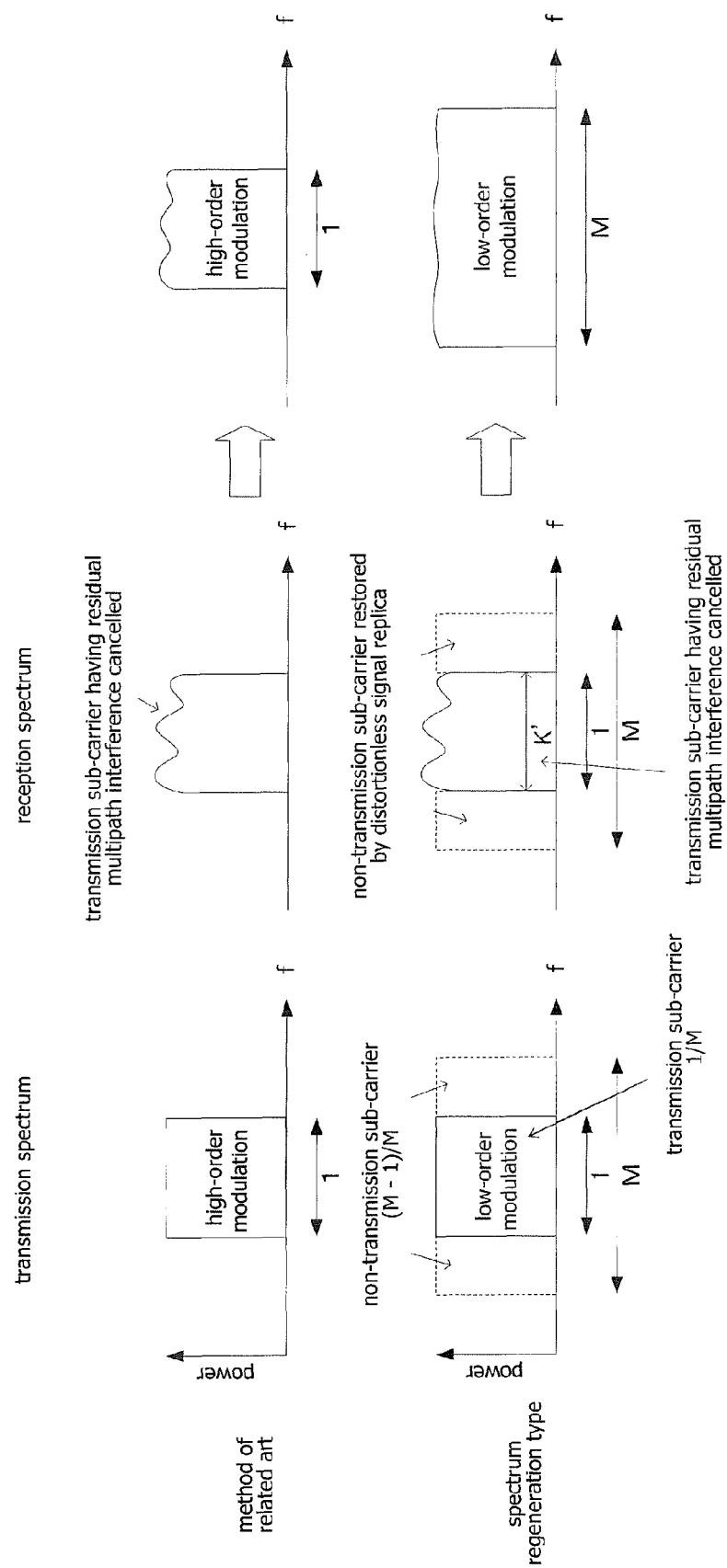
FIG. 8 is a diagram for explaining processing in the receiving device shown in FIG. 5.

$\hat{b}^{(i-1)}(p)$: bit replica of bit p
$b^{(i-1)}(p)$: log likelihood ratio of bit p The operation concept of the receiving device according to the present exemplary embodiment is shown in FIG. 8.

With respect to the related transmitting/receiving device, in a good SINR condition, high-order modulation is adopted for transmitting a transmission signal by the transmitting device. In the receiving device, a reception signal of a transmission sub-carrier is to be equalized, whereby multipath interference is suppressed.

On the other hand, with respect to the transmitting/receiving device (spectrum regeneration type) according to the present exemplary embodiment, in a good SINR condition, a transmission signal with M-fold bandwidth is to be produced at the transmitting device and a sub-carrier in an outside (M−1)/M portion of the frequency domain will be removed while a sub-carrier in a central 1/M portion will go through low-order modulation to be transmitted. In the receiving device, a reception signal of a transmission sub-carrier will have multipath interference cancelled, as in the case of the related method, and a non-transmission sub-carrier will have the spectrum restored using a distortionless signal replica.

According to the present exemplary embodiment, with the configurations described above, in a good SINR condition, it is possible to use low-order modulation where an inter-signal point distance is longer, instead of using high-order modulation where an inter-signal point distance is shorter, and by restoring the non-transmission sub-carrier at the receiving device, it is possible to achieve radio transmission with good transmission characteristics with the same frequency utilization efficiency as in the case of the related method.

Second Exemplary Embodiment

A transmitting/receiving device according to a second exemplary embodiment includes a transmitting device and a receiving device, and it is about a case in which a partial spectrum transmission is to be carried out using M number of code strings. Configurations of the transmitting device and the receiving device according to the present exemplary embodiment will be described with reference to FIG. 9 and FIG. 10, respectively. Differences between the first exemplary embodiment and the second exemplary embodiment will be shown in the following.

Figure 9:
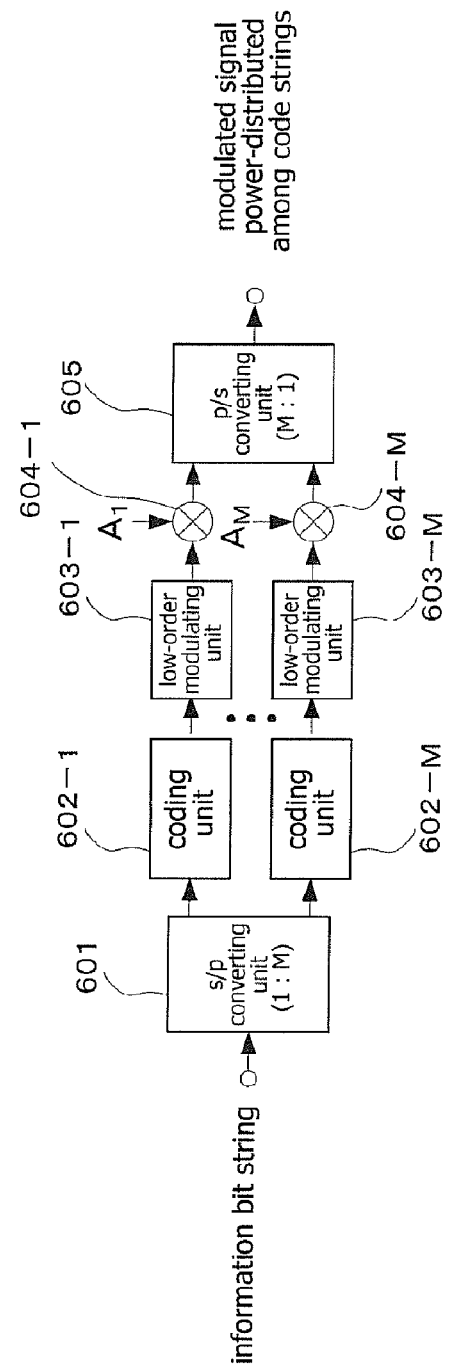
FIG. 9 is a block diagram showing one configuration example of a transmitting device according to a second exemplary embodiment.

The transmitting device shown in FIG. 9 includes serial/parallel (S/P) converting unit 601, coding units 602-1~602-M, low-order modulating units 603-1~603-M, weight multiplying units 604-1~604-M, and parallel/serial (P/S) converting unit 605.

In an output stage of P/S converting unit 605, components with the same configurations as frequency domain converting unit 103, partial spectrum selecting unit 104, sub-carrier mapping unit 105 and time domain converting unit 106 in the transmitting device (FIG. 4) according to the first exemplary embodiment are being provided.

S/P converting unit 601 is to receive an input of an information bit string to be transmitted, and S/P-convert (1:M) the bit string from the signal of a single string to signals of M strings. Moreover, S/P converting unit 601 is to output the S/P-converted bit strings to coding units 602-1~602-M.

Coding units 602-1~602-M are to receive the S/P-converted signals supplied from S/P converting unit 601 and encode the signals. Moreover, coding units 602-1~602-M are to output the encoded bit strings by respective code strings to low-order modulating units 603-1~603-M.

Low-order modulating units 603-1~603-M are to receive the encoded bit strings supplied from coding units 602-1~602-M and conduct low-order modulation on the encoded bit strings by respective code strings. With respect to the low-order modulation scheme, PSK is to be adopted, for example. Moreover, low-order modulating units 603-1~603-M are to output the low-order modulated signals by respective code strings to weight multiplying units 604-1~604-M.

Weight multiplying units 604-1~604-M are to receive the modulated signals supplied from low-order modulating units 603-1~603-M and conduct multiplication on respective code strings by predetermined weights to distribute power. Moreover, weight multiplying units 604-1~604-M are to output the modulated signals multiplied by the weights to P/S converting unit 605. As one example, weight coefficients $A_1$ and $A_2$ when M=2 can be derived by the following equation.

$$\begin{cases} A_1 = \sqrt{\dfrac{2}{1+\alpha}} \\ A_2 = \sqrt{\dfrac{2\alpha}{1+\alpha}} \end{cases} \quad \text{[Equation 9]}$$

$A_1, A_2$: weight coefficients
α (integer greater than or equal to one): power ratio between code strings P/S converting unit 605 is to receive the modulated signals of M strings, that were multiplied by the weights, supplied from weight multiplying units 604-1~604-M, and P/S-convert (M:1) the signals of M strings to a signal of a single string. Moreover, P/S converting unit 605 is to output the P/S-converted modulated signal to frequency domain converting unit 103.

What is different between the receiving device according to the present exemplary embodiment and the receiving device according to the first exemplary embodiment (FIG. 5) is decoding/replica generating unit 206, while frequency domain converting unit 201, sub-carrier demapping unit 202, channel estimation unit 203, iterative equalization unit 204, time domain converting unit 205 and frequency domain converting unit 207 are of the same configurations.

A detailed configuration of the decoding/replica generating unit 206 in the receiving device according to the present exemplary embodiment will be described with reference to FIG. 10.

Figure 10:
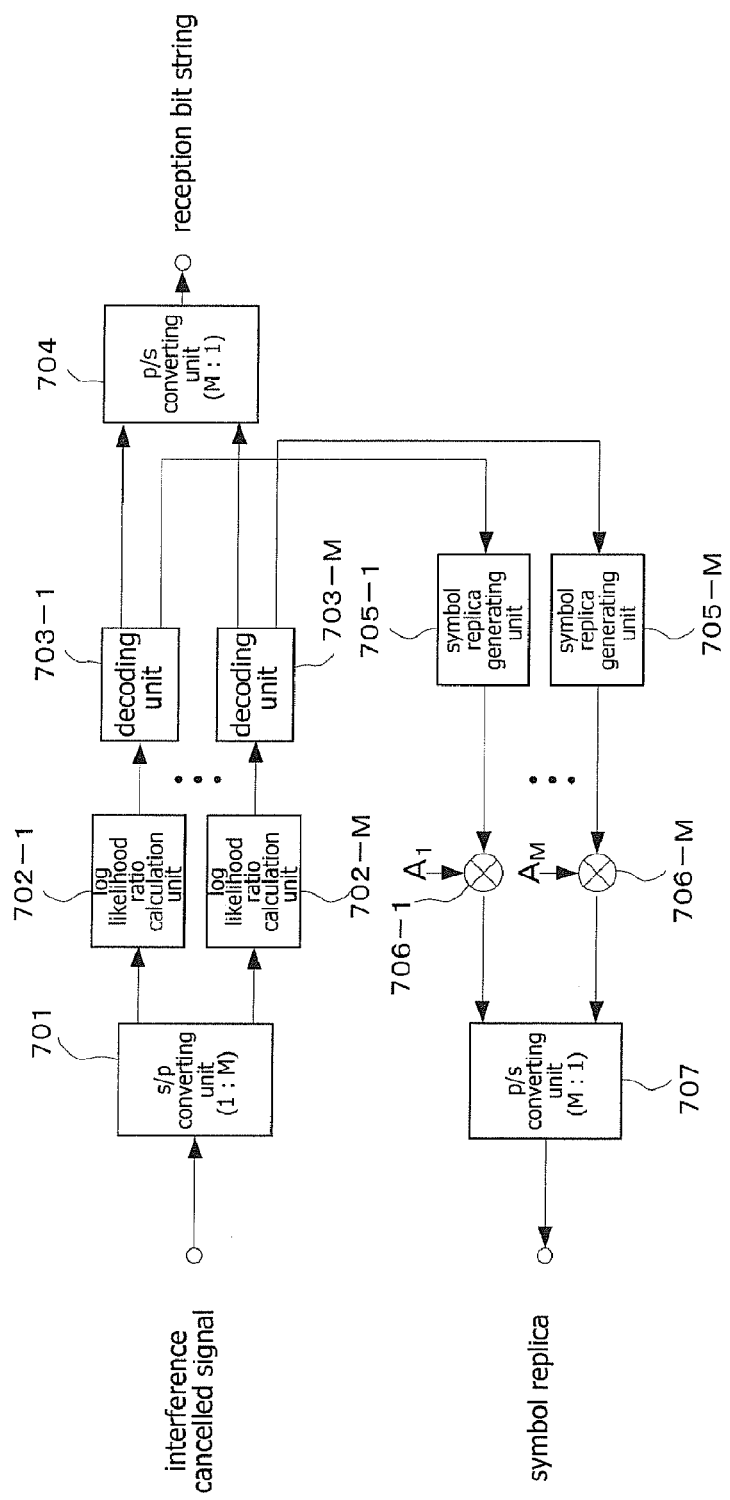
FIG. 10 is a block diagram showing one configuration example of a decoding/replica generating unit in a receiving device according to the second exemplary embodiment.

Decoding/replica generating unit 206 shown in FIG. 10 includes S/P converting unit 701, log likelihood ratio calculation units 702-1~702-M, decoding units 703-1~703-M, P/S converting unit 704, symbol replica generating units 705-1~705-M, weight multiplying units 706-1~706-M, and P/S converting unit 707.

S/P converting unit 701 is to receive the equalized signal, with the interference being cancelled, supplied from time domain converting unit 205, and S/P-convert (1:M) the signal from the signal of a single string to signals of M strings. Moreover, S/P converting unit 701 is to output the S/P-converted signals to log likelihood ratio calculation units 702-1~702-M.

Log likelihood ratio calculation units 702-1~702-M are to receive the S/P-converted signals supplied from S/P converting unit 701, and calculate log likelihood ratios of respective bits. Moreover, log likelihood ratio calculation units 702-1~702-M are to output the calculated log likelihood ratios to decoding units 703-1~703-M.

Decoding units 703-1~703-M are to receive the log likelihood ratios of respective bits supplied from log likelihood ratio calculation units 702-1~702-M and decode the log likelihood ratios. Moreover, decoding units 703-1~703-M are to output the information bits, that acquired higher reliability due to the decoding, to P/S converting unit 704, and output the information bits and the parity bits to symbol replica generating units 705-1~705-M.

P/S converting unit 704 is to receive the information bits of M strings supplied from decoding units 703-1~703-M, P/S-convert (M:1) the information bits from M strings to a single string, and output the P/S converted signal.

Symbol replica generating units 705-1~705-M are to receive the log likelihood ratios of respective bits supplied from decoding units 703-1~703-M, and generate symbol replicas. Moreover, symbol replica generating units 705-1~705-M are to output the generated symbol replicas to weight multiplying units 706-1~706-M.

Weight multiplying units 706-1~706-M are to receive the symbol replicas supplied from symbol replica generating units 705-1~705-M and conduct multiplication on respective strings by predetermined weights to distribute power. It is suitable that a predetermined weight to be used for each string is the same as the one used at the transmitting device. Moreover, weight multiplying units 706-1~706-M are to output the symbol replicas multiplied by the weights to P/S converting unit 707.

P/S converting unit 707 is to receive the signals of M strings, that were multiplied by the weights, supplied from weight multiplying units 706-1~706-M, and P/S-convert (M:1) the signals from M strings to a single string. Moreover, P/S converting unit 707 is to output the P/S-converted signal to frequency domain converting unit 207.

According to the present exemplary embodiment, with the above-described configurations, it is possible to produce power differences among code strings, whereby strings with larger power will be demodulated first with high precision, and interference replica, which is given by the string having larger power to the string that has less power, will be generated with high precision. Furthermore, as the iteration processes advance, the interference added to the string with less power will be cancelled, whereby the strings with less power will also be able to be demodulated with high precision, and thus, the effect of reducing inter-symbol interference can be achieved.

Figure 11:
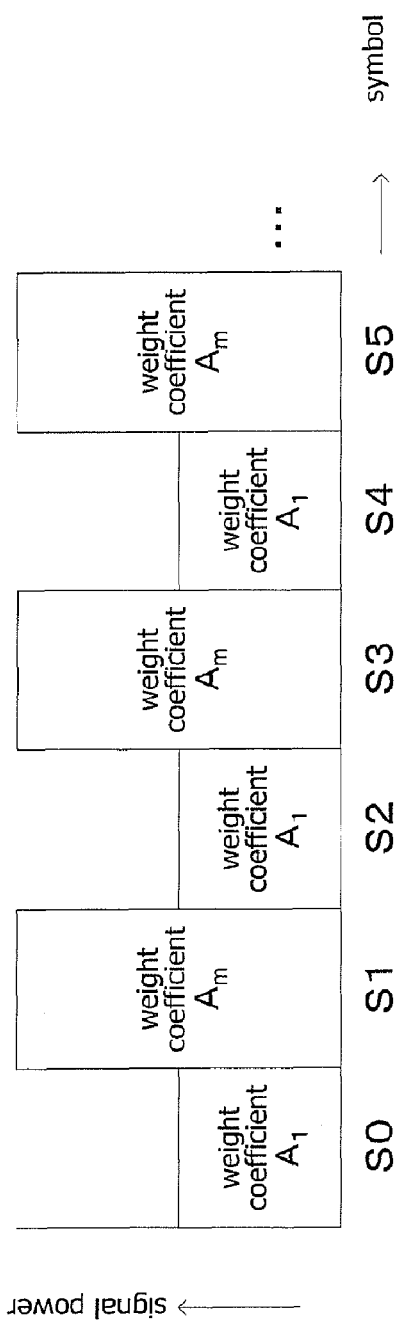
FIG. 11 is a diagram for supplementarily explaining processing in the transmitting device shown in FIG. 9.

FIG. 11 shows a frame format of a transmission signal of P/S converting unit 605 in the transmitting device shown in FIG. 9.

In FIG. 11, a vertical axis indicates signal power and a lateral axis indicates symbols. Reference character "$A_1$" indicates a weight coefficient of a code string 1 and reference character "$A_m$" indicates a weight coefficient of code string "m" (m=1, 2, ..., M). By multiplying the code strings by the weight coefficients at M-symbol intervals, at weight multiplying units 604-1~604-M in the transmitting device, power can be distributed among strings.

Figure 12:
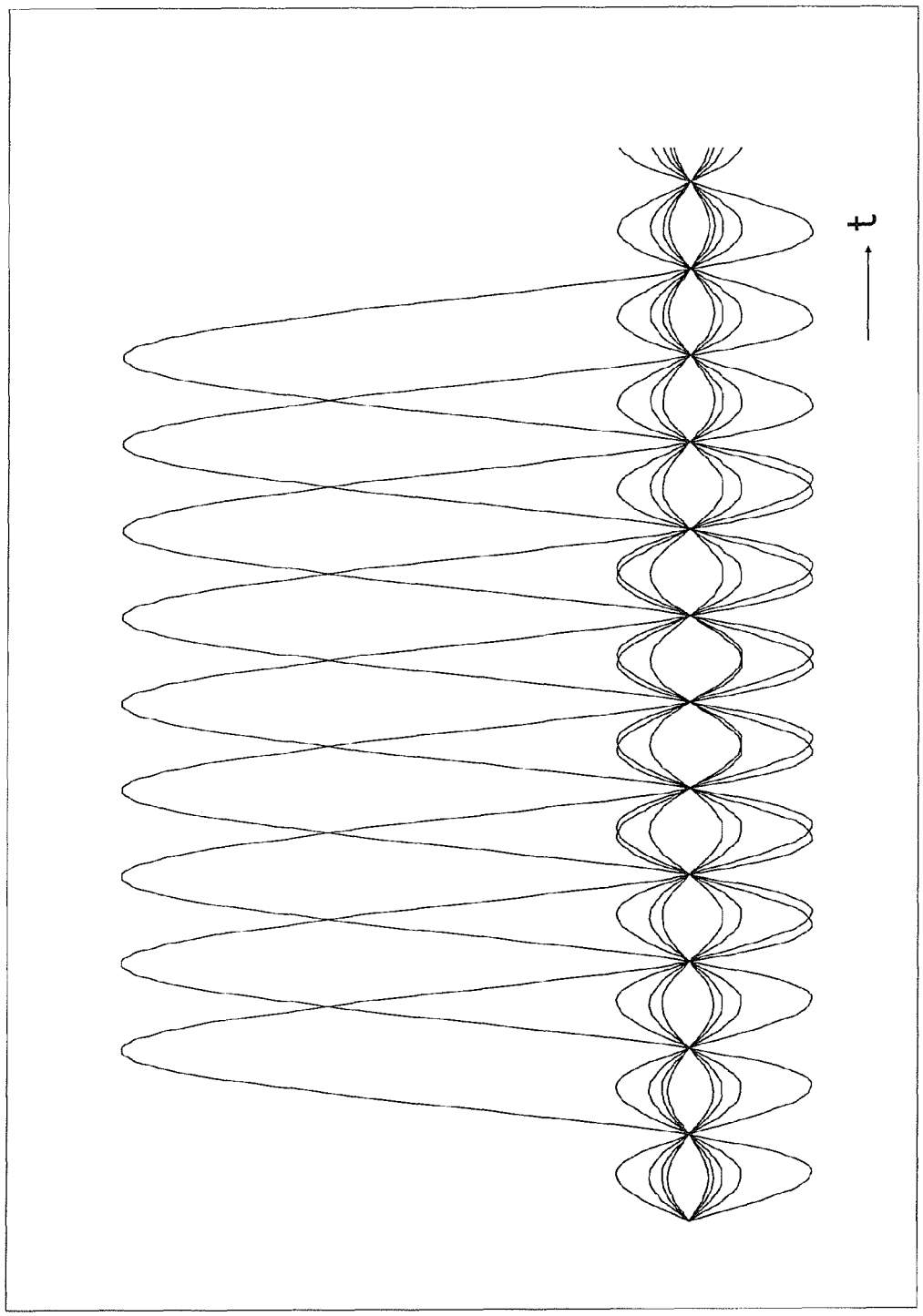
FIG. 12 is a diagram for supplementarily explaining the processing in the transmitting device shown in FIG. 9.
Figure 13:
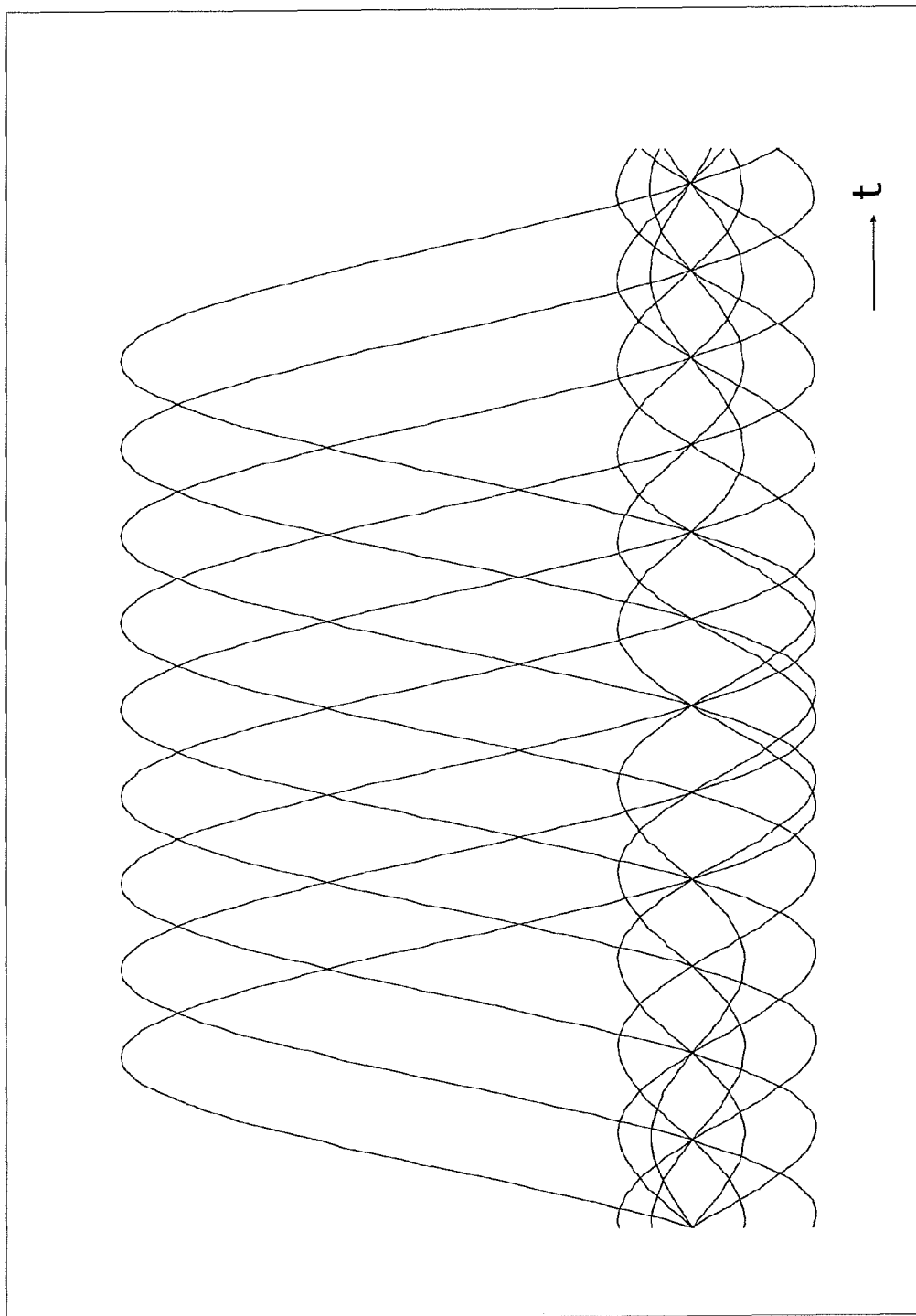
FIG. 13 is a diagram for supplementarily explaining the processing in the transmitting device shown in FIG. 9.
Figure 14:
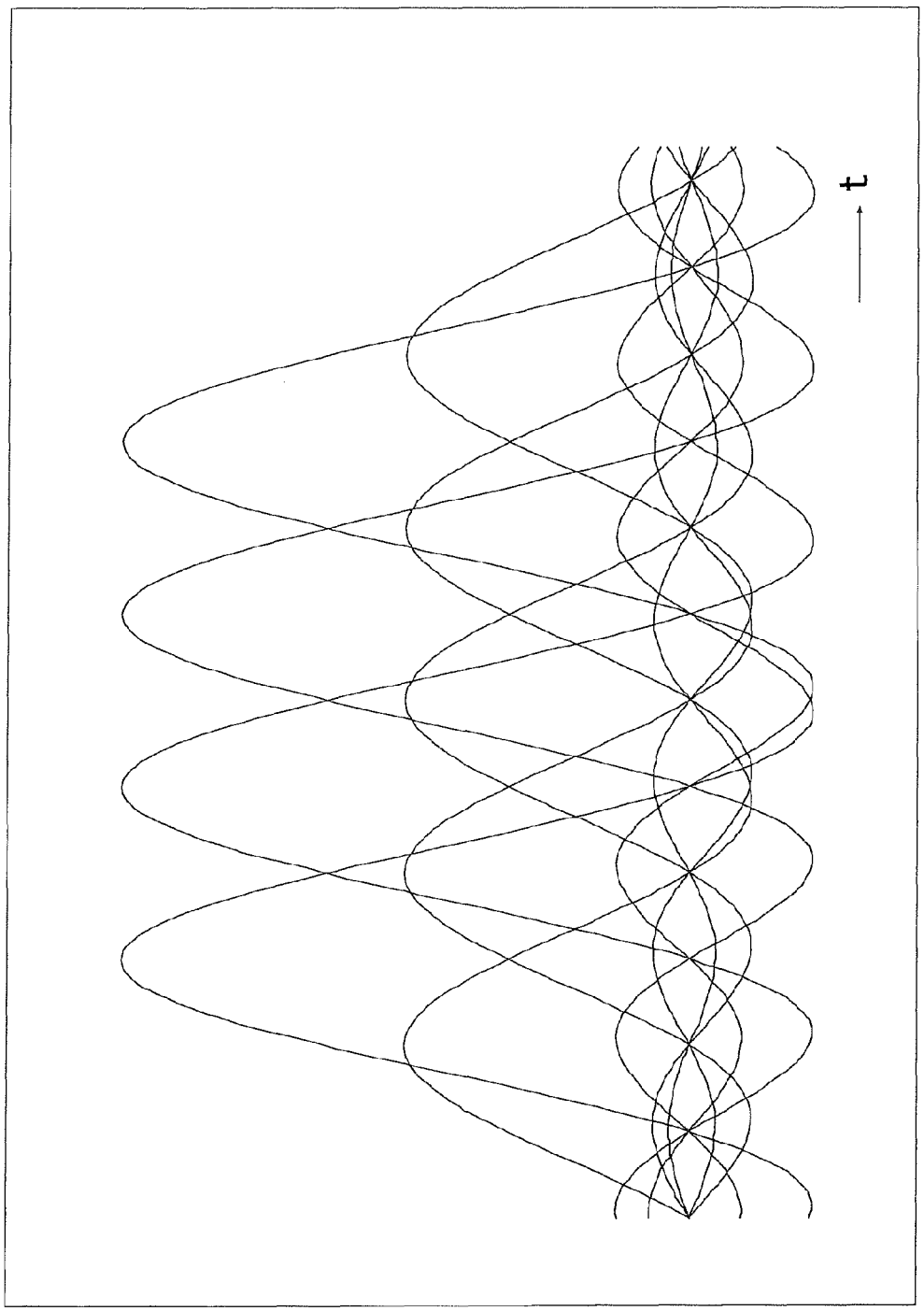
FIG. 14 is a diagram for supplementarily explaining the processing in the transmitting device shown in FIG. 9.

FIG. 12~FIG. 14 show different cases of impulse responses of output signals, after the partial spectrum selection, being carried out at the transmitting device. In FIG. 12~FIG. 14, a vertical axis indicates power and a lateral axis indicates time. Furthermore, in the cases of conducting partial spectrum selection (FIG. 13 and FIG. 14), M is to be considered as two, for example.

FIG. 12 shows an impulse response in a case when partial spectrum selection is not carried out. Since impulse strings are to be transmitted at Nyquist intervals, inter-symbol interference will become zero at the center of a reception impulse.

FIG. 13 shows an impulse response in a case when partial spectrum selection is carried out. Due to the partial spectrum selection, reception impulses will expand, whereby inter-symbol interference will occur at the center of the reception impulse. In this case, inter-symbol interference will become zero at the reception impulse which is M impulses apart.

FIG. 14 shows an impulse response in a case when partial spectrum selection is carried out while power differences are being produced among code strings. In this case, inter-symbol interference will occur at the center of a reception impulse. However, since power differences are being produced among code strings, interferences that reception impulses that have strings with larger power receive from reception impulses that have strings with less power will become smaller.

Third Exemplary Embodiment

A transmitting/receiving device according to a third exemplary embodiment includes a transmitting device and a receiving device, and concerns a case of interference canceller type in which inter-code string interferences of M number of code strings are to be cancelled at the receiving device. A configuration of the receiving device according to the present exemplary embodiment will be described with reference to FIG. 15. The transmitting device according to the present exemplary embodiment is the same as the transmitting device according to the second exemplary embodiment.

Figure 15:
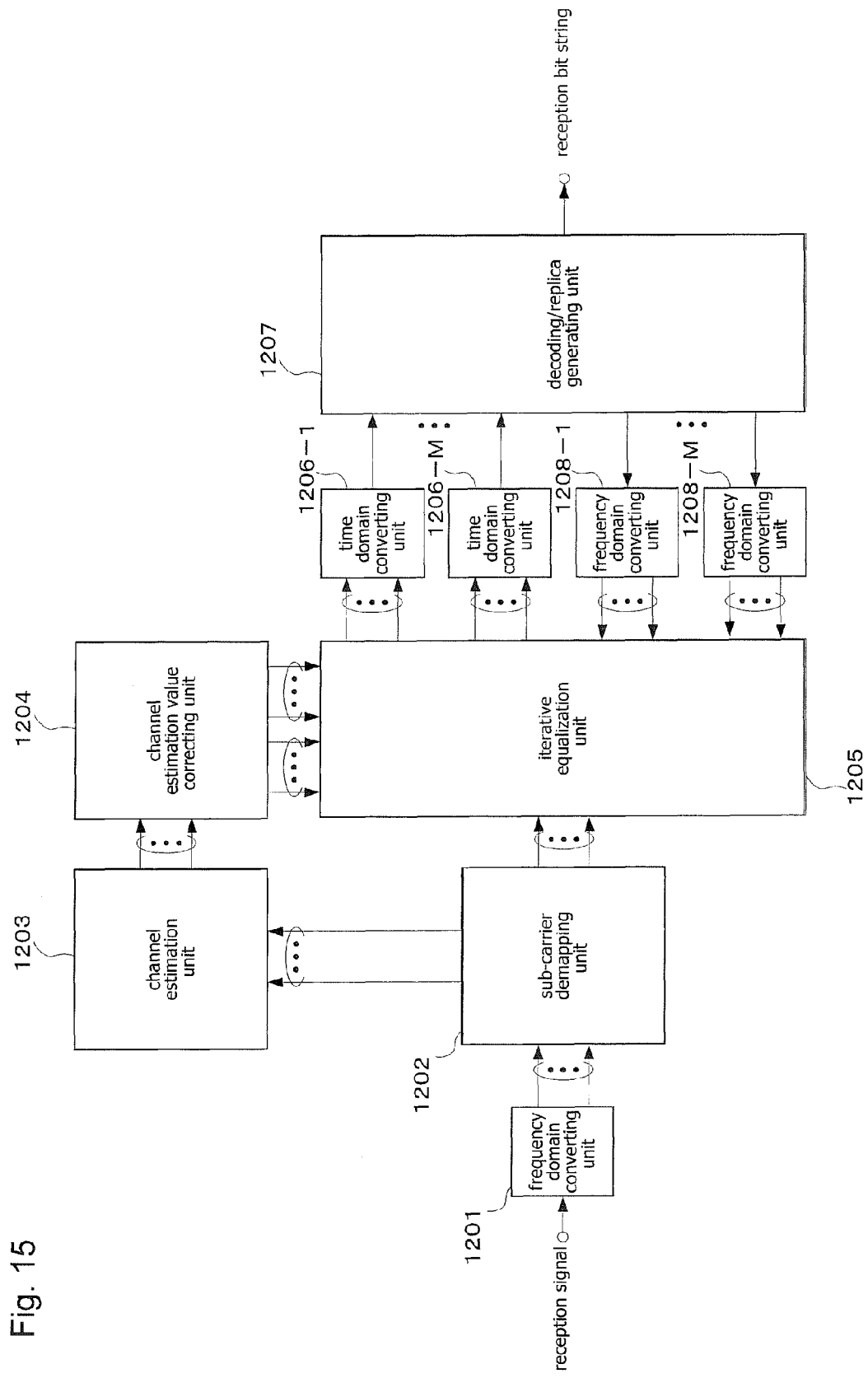
FIG. 15 is a block diagram showing one configuration example of a receiving device according to a third exemplary embodiment.

The receiving device shown in FIG. 15 includes frequency domain converting unit 1201, sub-carrier demapping unit 1202, channel estimation unit 1203, channel estimation value correcting unit 1204, iterative equalization unit 1205, time domain converting units 1206-1~1206-M, decoding/replica generating unit 1207, and frequency domain converting units 1208-1~1208-M.

Frequency domain converting unit 1201 is to receive an input of a reception signal and convert the signal from a time domain signal to a frequency domain signal. Here, it is suitable that a reception spectrum be of the same band width (1/M) as the spectrum after partial spectrum selection at the transmitting device. Moreover, frequency domain converting unit 1201 is to output the frequency domain signal reception signal, obtained by the conversion, to sub-carrier demapping unit 1202.

Sub-carrier demapping unit 1202 is to receive the frequency domain reception signal supplied from frequency domain converting unit 1201 and conduct sub-carrier demapping of the signal, which selects a desired sub-carrier. Moreover, sub-carrier demapping unit 1202 is to output the sub-carrier demapped reception signal to channel estimation unit 1203 and to iterative equalization unit 1205.

Channel estimation unit 1203 is to receive the frequency domain reference reception signal supplied from sub-carrier demapping unit 1202 and calculate a channel estimation value based on reference correlation. Moreover, channel estimation unit 1203 is to output the calculated channel estimation value to channel estimation value correcting unit 1204.

Channel estimation value correcting unit 1204 is to receive the channel estimation value supplied from channel estimation unit 1203, and make corrections on inter-string power distribution and time difference accompanied by the P/S conversion, at the transmitting device, by frequency domain processing. Moreover, channel estimation value correcting unit 1204 is to output the corrected channel estimation value to iterative equalization unit 1205. The corrected channel estimation value with code string "m" and sub-carrier "k" can be represented by the following equation.

$$\hat{H}_m(k) = \begin{cases} H(k)A_m e^{-j2\pi\frac{k(m-1)}{KM}} & \ldots\; k \leq \frac{K}{2}, m > 1 \\ H(k)A_m e^{-j2\pi\frac{k(m-1)}{KM}} e^{j2\pi\frac{m-1}{M}} & \ldots\; k > \frac{K}{2}, m > 1 \end{cases} \quad \text{[Equation 10]}$$

$\hat{H}_m(k)$: corrected channel estimation value
$H(k)$: channel estimation value
$A_m$: power weight of code sting Iterative equalization unit 1205 is to receive the sub-carrier demapped frequency domain reception signal supplied from sub-carrier demapping unit 1202, the corrected channel estimation value supplied from channel estimation value correcting unit 1204, and symbol replicas supplied from frequency domain converting units 1208-1~1208-M, the symbol replicas having been generated based on the previous decoding result. Iterative equalization unit 1205 is to equalize the reception signal based on the corrected channel estimation value by frequency domain processing, and along with that, cancel interference from the equalized signal using the symbol replica. Moreover, iterative equalization unit 1205 is to output the equalized signals, whose the interferences have been cancelled, to time domain converting units 1206-1~1206-M.

Time domain converting units 1206-1~1206-M are to receive the equalized signals, whose the interferences have been cancelled, supplied from iterative equalization unit 1205, and convert the signals from frequency domain signals to time domain signals. Moreover, time domain converting units 1206-1~1206-M are to output the time domain signals, obtained by the conversion, whose the interferences have been cancelled, to decoding/replica generating unit 1207.

Decoding/replica generating unit 1207 is to receive the time domain equalized signals, whose the interferences have been cancelled, supplied from time domain converting units 1206-1~1206-M, and decode the signals with respect to respective code strings. Moreover, decoding/replica generating unit 1207 is to generate symbol replicas from decoded bit strings, and output the generated symbol replicas to frequency domain converting units 1208-1~1208-M. Furthermore, decoding/replica generating unit 1207 is to P/S-convert the decoded bit strings to be outputted as a reception bit string.

Frequency domain converting units 1208-1~1208-M are to receive the time domain symbol replicas supplied from decoding/replica generating unit 1207 and convert the symbol replicas from time domain signals to frequency domain signals. Moreover, frequency domain converting units 1208-1~1208-M are to output the symbol replicas, having been converted to frequency domain signals, to iterative equalization unit 1205.

Figure 16:
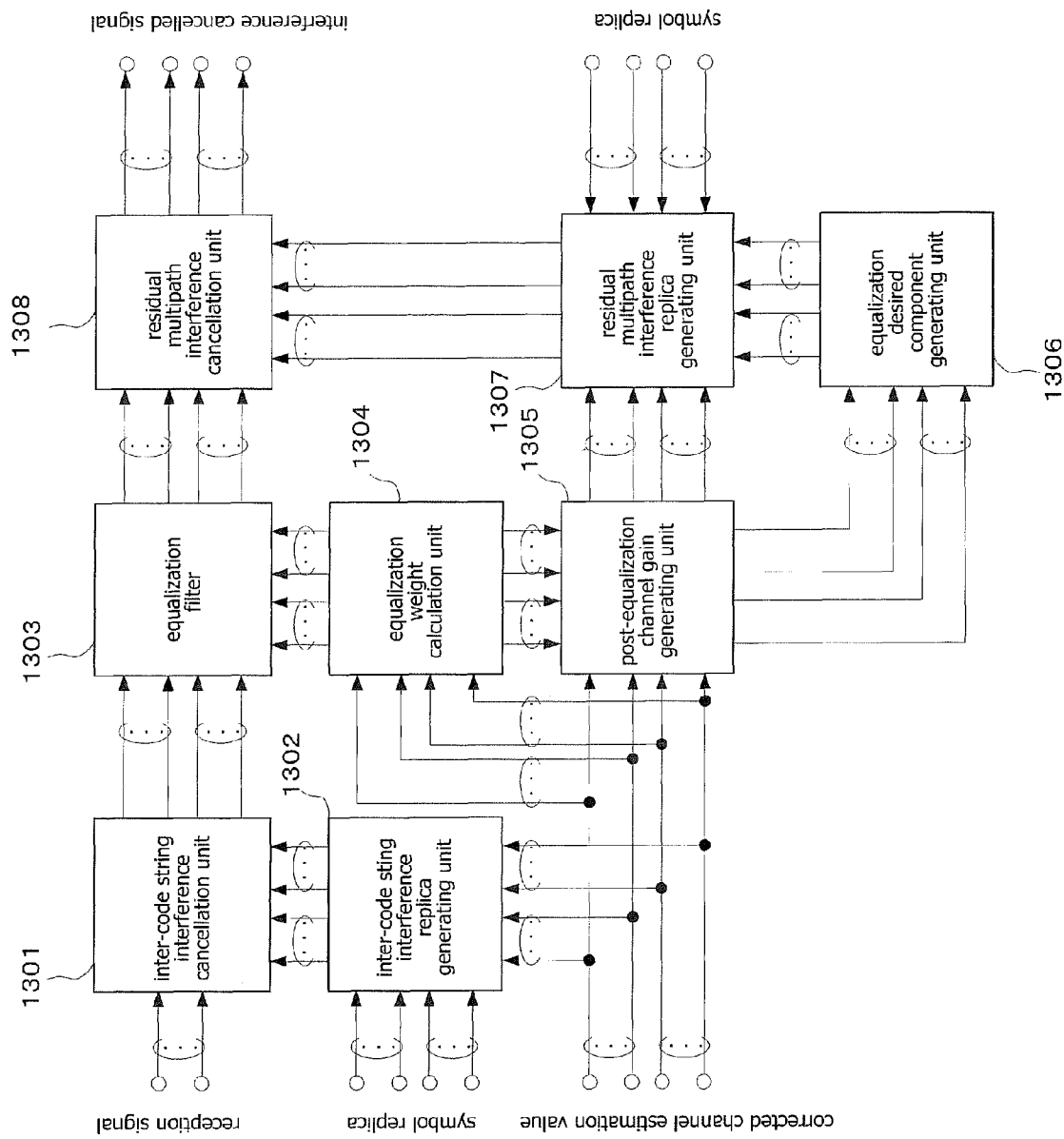
FIG. 16 is a block diagram showing one configuration example of an iterative equalization unit shown in FIG. 15.

Next, a detailed configuration of iterative equalization unit 1205 shown in FIG. 15 will be described with reference to FIG. 16.

Iterative equalization unit 1205 includes inter-code string interference cancellation unit 1301, inter-code string interference replica generating unit 1302, equalization filter 1303, equalization weight calculation unit 1304, post-equalization channel gain generating unit 1305, equalization desired component generating unit 1306, residual multipath interference replica generating unit 1307, and residual multipath interference cancellation unit 307.

Inter-code string interference cancellation unit 1301 is to receive the sub-carrier demapped frequency domain reception signal supplied from sub-carrier demapping unit 1202 and an inter-code string interference replica supplied from inter-code string interference replica generating unit 1302, and subtract the inter-code string interference replica from the reception signal. Moreover, inter-code string interference cancellation unit 1301 is to output the inter-code string interference replica cancelled signal, with the replica being cancelled, to equalization filter 1303.

Inter-code string interference replica generating unit 1302 is to receive the symbol replicas supplied from frequency domain converting units 1208-1~1208-M and the corrected channel estimation value supplied from channel estimation value correcting unit 1204, and generate inter-code string interference replicas. Moreover, inter-code string interference replica generating unit 1302 is to output the generated inter-code string interference replicas to inter-code string interference cancellation unit 1301.

The inter-code string interference cancelled signal with code string "m", sub-carrier "k" and iteration count "i" can be represented by the following equation.

$$\overline{R}_m^{(i)}(k) = R(k) - \sum_{m'=1, m' \neq m}^{M} \hat{H}_{m'}(k)\hat{s}_{m'}^{(i-1)}(k) \quad \text{[Equation 11]}$$

$\overline{R}_m^{(i)}(k)$: inter-code string interference cancelled signal
$R(k)$: reception signal $\hat{H}_m(k)$: corrected channel estimation value
$\hat{S}_m^{(i-1)}(k)$: symbol replica Equalization filter 1303 is to receive the inter-code string interference replica cancelled signal supplied from inter-code string interference cancellation unit 1301 and an equalization weight supplied from equalization weight calculation unit 1304, and equalize the inter-code string interference replica cancelled signal based on the equalization weight by frequency domain processing. Moreover, equalization filter 1303 is to output the equalized signal to residual multipath interference cancellation unit 1308.

Equalized weight calculation unit 1304 is to receive the corrected channel estimation value supplied from channel estimation value correcting unit 1204 and calculate the equalization weight. With respect to the equalization weight, the MMSE weight is suitable. Moreover, equalization weight calculation unit 1304 is to output the calculated equalization weight to equalization filter 1303 and to post-equalization channel gain generating unit 1305.

Post-equalization channel gain generating unit 1305 is to receive the corrected channel estimation value supplied from channel estimation value correcting unit 1204 and the equalization weight supplied from equalization weight calculation unit 1304, and generate a post-equalization channel gain. Moreover, post-equalization channel gain generating unit 1305 is to output the generated post-equalization channel gain to equalization desired component generating unit 1306 and to residual multipath interference replica generating unit 1307.

Equalization desired component generating unit 1306 is to receive the post-equalization channel gain supplied from post-equalization channel gain generating unit 1305 and produce an equalization desired component which is being an average value of the post-equalization channel gains. Moreover, equalization desired component generating unit 1306 is to output the generated equalization desired component to residual multipath interference replica generating unit 1307.

Residual multipath interference replica generating unit 1307 is to receive the symbol replicas supplied from frequency domain converting units 1208-1~1208-M, the post-equalization channel gain supplied from post-equalization channel gain generating unit 1305 and the equalization desired component supplied from equalization desired component generating unit 1306, and generate a residual multipath interference replica. Moreover, residual multipath interference replica generating unit 1307 is to output the generated residual multipath interference replica to residual multipath interference cancellation unit 1308.

Residual multipath interference cancellation unit 1308 is to receive the equalized signal supplied from equalization filter 1303 and the residual multipath interference replica supplied from residual multipath interference replica generating unit 1307, and cancel the residual multipath interference replica from the equalized signal. Moreover, residual multipath interference cancellation unit 1308 is to output the residual multipath interference replica cancelled signals, with the replicas being cancelled, to time domain converting units 1206-1~1206-M.

The equalized signal, after having the residual multipath interference replica being cancelled, with code string "m", sub-carrier "k" and iteration count "i" can be represented by the following equation.

$$\hat{R}_m^{(i)}(k) = W_m^{(i)}(k)\overline{R}_m^{(i)}(k) - \left(W_m^{(i)}(k)\hat{H}_m(k) - \tilde{H}_m^{(i)}\right)\hat{s}_m^{(i-1)}(k) \quad [\text{Equation 12}]$$

$$\tilde{H}_m^{(i)} = \frac{1}{K}\sum_{k=1}^{K} W_m^{(i)}(k)\hat{H}_m(k)$$

$\hat{R}_m^{(i)}(k)$: equalized signal after interference being cancelled
$W_m^{(i)}(k)\overline{R}_m^{(i)}(k)$: equalized signal
$W_m^{(i)}(k)\hat{H}_m(k)$: post-equalization channel gain
$\tilde{H}_m^{(i)}$: equalization desired component
$W_m^{(i)}(k)$: equalization weight considering residual interference power
$\overline{R}_m^{(i)}(k)$: inter-code string interference cancelled signal
$\hat{H}_m(k)$: corrected channel estimation value
$\hat{S}_m^{(i-1)}(k)$: symbol replica The equalization weight with code string "m", sub-carrier "k" and iteration count "i" can be represented by the following equation.

$$W_m^{(i)}(k) = \hat{H}_m^*(k)[\hat{H}(k)G^{(i)}\hat{H}^H(k)+\sigma^2]^{-1} \quad [\text{Equation 13}]$$

$W_m^{(i)}(k)$: equalization weight with m, k and i
$\hat{H}(k)$: corrected channel estimation vector composed of $\hat{H}_m(k$ ( ) row vector of m-th column)
$G^{(i)}$: diagonal matrix
$\sigma^2$: noise power The diagonal matrix can be derived by the following equation.

$$G^{(i)} = \text{diag}[g_1^{(i)}, \ldots, g_M^{(i)}] \quad [\text{Equation 14}]$$

$G^{(i)}$: diagonal matrix
$g_m^{(i)}$: residual interference power of code string The residual interference power of each code string can be derived by the following equation.

$$g_m^{(i)} = 1 - \frac{1}{T}\sum_{t=1}^{T} |\hat{s}_m^{(i-1)}(t)|^2 \quad [\text{Equation 15}]$$

Figure 17:
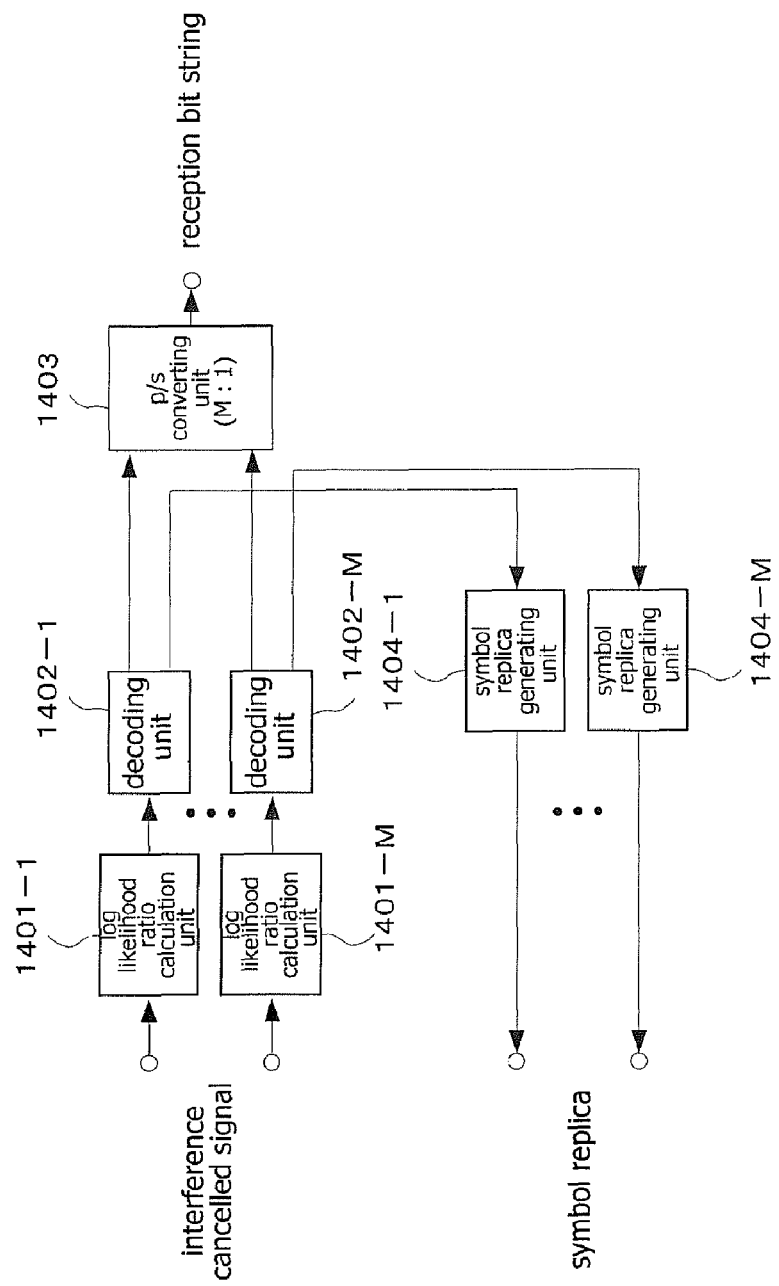
FIG. 17 is a block diagram showing one configuration example of a decoding/replica generating unit shown in FIG. 15.

$g_m^{(i)}$: residual interference power of code string
$\hat{s}_m^{(i-1)}(t)$: time domain symbol replica Next, a detailed configuration of the decoding/replica generating unit 1207 shown in FIG. 15 will be described with reference to FIG. 17.

Decoding/replica generating unit 1207 includes log likelihood ratio generating units 1401-1~1401-M, decoding units 1402-1~1402-M, P/S converting unit 1403, and symbol replica generating units 1404-1~1404-M.

Log likelihood ratio generating units 1401-1~1401-M are to receive the equalized signals, with the interferences being cancelled, supplied from time domain converting units 1206-1~1206-M, and calculate the log likelihood ratios of respective bits. Moreover, log likelihood ratio generating units 1401-1~1401-M are to output the calculated log likelihood ratios to decoding units 1402-1~1402-M.

Decoding units 1402-1~1402-M are to receive the log likelihood ratios supplied from log likelihood ratio generating units 1401-1~1401-M and decode them. Moreover, decoding units 1402-1~1402-M are to output the information bits, having been decoded, to P/S converting unit 1403. Furthermore, decoding units 1402-1~1402-M are to output the log likelihood ratios of the information bits and the parity bits, having been decoded, to symbol replica generating units 1404-1~1404-M.

P/S converting unit 1403 is to receive the information bits, having been decoded, supplied from decoding units 1402-1~1402-M, P/S-convert (M:1) the information bits from M strings to a single string, and output the P/S-converted signal.

Symbol replica generating units 1404-1~1404-M are to receive the log likelihood ratios of the information bits and the parity bits, having been decoded, supplied from decoding units 1402-1~1402-M, and generate symbol replicas. Moreover, symbol replica generating units 1404-1~1404-M are to output the generated symbol replicas to frequency domain converting units 1208-1~1208-M.

Figure 18:
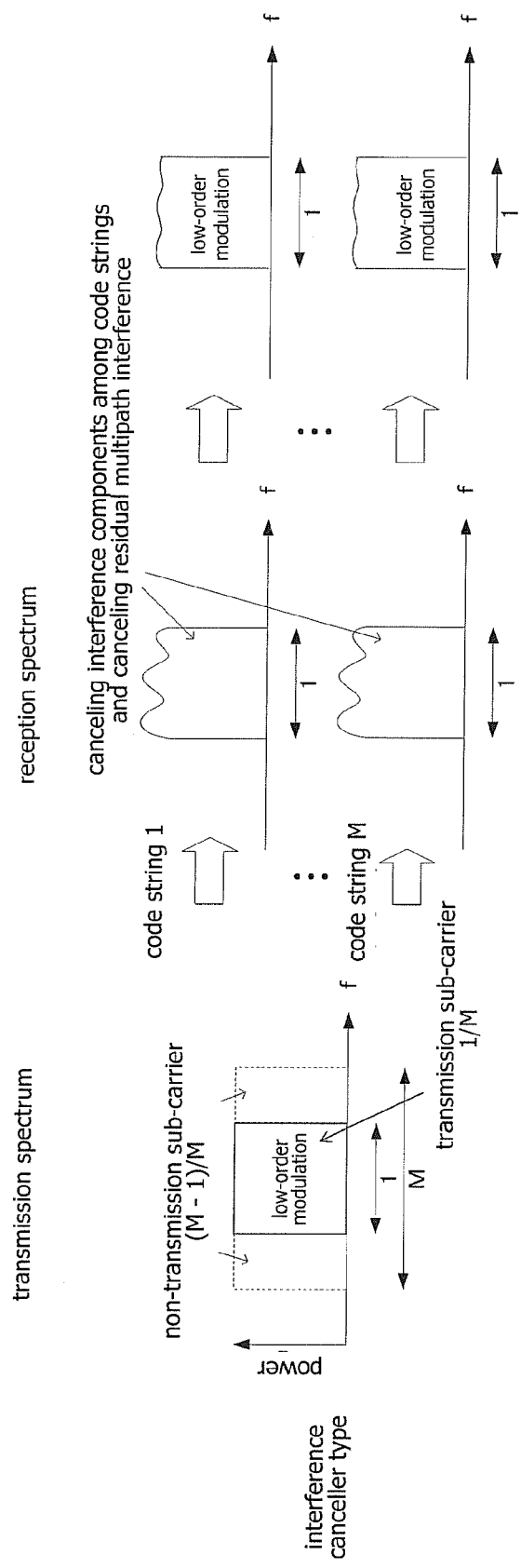
FIG. 18 is a diagram for explaining processing in the receiving device shown in FIG. 15.

The operation concept of the receiving device according to the present exemplary embodiment is shown in FIG. 18.

In the receiving device according to the present exemplary embodiment, with respect to the transmission sub-carrier, an interference replica of the other code string is to be generated and cancelled, whereby inter-symbol interference attributed to the partial spectrum selection will be cancelled. Furthermore, in the receiving device according to the present exemplary embodiment, residual multipath interference with the self code string will be suppressed.

According to the present exemplary embodiment, with the configurations described above, at the receiving device, in a good SINR condition, it is possible to cancel inter-symbol interferences among code strings attributed to the partial spectrum selection, by using low-order modulation where the inter-signal point distance is longer, instead of using high-order modulation where the inter-signal point distance is shorter. Thereby, it is possible to achieve radio transmission having excellent transmission characteristics, with the same frequency utilization efficiency as in the case of the related method.

Although the first to third exemplary embodiments have exhibited examples of the receiving device in which symbol replicas are generated based on the log likelihood ratios after being decoded, it is also possible to have an arrangement in which the symbol replicas are generated based on the log likelihood ratios before being decoded.

Furthermore, although the first to third exemplary embodiments have exhibited examples of a SISO (Single Input Single Output) transmitting/receiving device, the present invention also proves effective with MIMO (Multiple Input Multiple Output), and thus may be applied to a MIMO transmitting/receiving device.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A transmitting device, which transmits a single-carrier signal, comprising:
   a coding unit which encodes a transmission information bit string and outputs the encoded transmission information bit string as a code bit string;
   a low-order modulating unit which conducts low-order modulation on the code bit string outputted from the encoding unit and outputs the low-order modulated code bit string as a low-order modulated signal;
   a first frequency domain converting unit which converts the low-order modulated signal outputted from the low-order modulating unit to a frequency domain signal and outputs the converted low-order modulated signal as a frequency spectrum;
   a partial spectrum selecting unit which selects a central 1/M portion (M is an integer greater than or equal to two) of a spectrum from the frequency spectrum outputted from the first frequency domain converting unit and outputs a spectrum selected signal;
   a first time domain converting unit which converts the spectrum selected signal outputted from the partial spectrum selecting unit to a time domain signal and outputs the converted spectrum selected signal as a transmission signal;
   a first serial/parallel converting unit which converts the transmission information bit string to M number of strings and outputs the M number of strings;
   wherein:
   the encoding unit encodes the respective signals of the M number of strings outputted from the first serial/parallel converting unit and outputs the encoded signals as code bit strings, and
   the low-order modulating unit conducts low-order modulation on the respective code bit strings of the M number of strings outputted from the encoding unit and outputs the low-order modulated code bit strings of the M number of strings as low-order modulated signals, the transmitting device further comprising:
   a weight multiplying unit which distributes predetermined power to the low-order modulated signals of the M number of strings outputted from the low-order modulating unit and outputs the power-distributed low-order modulated signals; and
   a first parallel/serial converting unit which converts the power-distributed low-order modulated signals of the M number of strings outputted from the weight multiplying unit to a single string and outputs the string to the first frequency domain converting unit.

2. A transmitting/receiving device, which transmits a single-carrier signal, comprising:
   a transmitting device including:
   a coding unit which encodes a transmission information bit string and outputs the encoded transmission information bit string as a code bit string,
   a low-order modulating unit which conducts low-order modulation on the code bit string outputted from the encoding unit and outputs the low-order modulated code bit string as a low-order modulated signal,
   a first frequency domain converting unit which converts the low-order modulated signal outputted from the low-order modulating unit to a frequency domain signal and outputs the converted low-order modulated signal as a frequency spectrum,
   a partial spectrum selecting unit which selects a central 1/M portion (M is an integer greater than or equal to two) of a spectrum from the frequency spectrum outputted from the first frequency domain converting unit and outputs a spectrum selected signal, and
   a first time domain converting unit which converts the spectrum selected signal outputted from the partial spectrum selecting unit to a time domain signal and outputs the converted spectrum selected signal as a transmission signal; and
   a receiving device including:
   a second frequency domain converting unit which converts a reception signal to a frequency domain signal, and outputs the converted reception signal as a reception signal including a reference reception signal,
   a channel estimation unit which conducts channel estimation on the basis of the frequency domain reference reception signal outputted from the second frequency domain converting unit and outputs a channel estimation value,
   an iterative equalization unit which equalizes the frequency domain reception signal outputted from the second frequency domain converting unit using the channel estimation value outputted from the channel estimation unit, iteratively cancels inter-symbol interference from the equalized signal using a frequency domain symbol replica and outputs the signal as an interference cancelled signal, a second time domain converting unit which converts the interference cancelled signal outputted frot the iterative equalization unit to a time domain interference cancelled signal and outputs the time domain interference cancelled signal, a decoding/replica generating unit which decodes the time domain interference cancelled signal outputted from the second time domain converting unit, generates a symbol replica based on the decoding result and outputs the generated symbol replica, and a third frequency domain converting unit which converts the symbol replica outputted from the decoding/replica generating unit to a frequency domain signal and outputs the frequency domain signal of the symbol replica to the iterative equalization unit, wherein the iterative equalization unit includes:

an equalization weight calculation unit which calculates an equalization weight using the channel estimation value outputted from the channel estimation unit and outputs the calculated equalization weight;

a post-equalization channel gain generating unit which calculates a post-equalization channel gain using the equalization weight outputted from the equalization weight calculation unit and outputs the calculated post-equalization channel gain;

an equalization filter which equalizes the frequency domain reception signal outputted from the second frequency domain converting unit based on the equalization weight outputted from the equalization weight calculation unit and outputs the equalized frequency domain reception signal as an equalized signal;

an equalization desired component generating unit which calculates an equalization desired component based on the post-equalization channel gain outputted from the post-equalization channel gain generating unit and outputs the equalization desired component;

a residual multipath interference replica generating unit which generates a residual multipath interference replica based on the post-equalization channel gain outputted from the post-equalization channel gain generating unit, the equalization desired component outputted from the equalization desired component generating unit and the symbol replica outputted from the third frequency domain converting unit, and outputs the generated residual multipath interference replica;

a distortionless signal replica generating unit which generates a distortionless signal replica based on the equalization desired component outputted from the equalization desired component generating unit and the symbol replica outputted from the third frequency domain converting unit, and outputs the generated distortionless signal replica; and an interference cancellation unit which cancels inter-symbol interference from the equalized signal outputted from the equalization filter using the residual multipath interference replica outputted from the residual multipath interference replica generating unit and the distortionless signal replica outputted from the distortionless signal replica generating unit, and outputs the equalized signal with the inter-symbol interference being cancelled as the interference cancelled signal.

3. The transmitting/receiving device according to claim 2, wherein the iterative equalization unit generates the interference cancelled signal with sub-carrier "k" and iteration count "i" to meet the following equation, while the sub-carrier of the frequency domain reception signal is being defined as "k" (k=1, 2, K (K is an integer greater than or equal to two, and indicates the number of sub-carriers)) and the iteration count is being defined as "i" (i=1, 2, . . . )

$$\hat{R}^{(i)}(k) = \begin{cases} W^{(i)}(k)R(k) - \left(W^{(i)}(k)H(k) - \tilde{H}^{(i)}\right)\hat{S}^{(i-1)}(k) \ldots \text{ if "}k\text{" is transmission sub-carrier} \\ \tilde{H}^{(i)}\hat{S}^{(i-1)}(k) \ldots \text{ if "}k\text{" is non-transmission sub-carrier} \end{cases}$$

$\hat{R}^{(i)}(k)$: interference cancelled signal with k and i
$W^{(i)}(k)$: equalization weight with k and i
$R(k)$: reception signal with k and i
$H(k)$: channel estimation value with k
$\tilde{H}^{(i)}$: equalization desired component with i
$\hat{S}^{(i-1)}(k)$: symbol replica with k and i−1.

4. The transmitting/receiving device according to claim 3, wherein the equalization desired component generating unit generates the equalization desired component with iteration count "i" to meet the following equation, while the transmission sub-carrier is being defined as "k'" (k'∈K' (K' indicates sets of transmission sub-carriers as elements)) and the iteration count is being defined as "i" (i=1, 2, . . . )

$$\tilde{H}^{(i)} = \frac{1}{n(K')} \sum_{k' \in K'} W^{(i)}(k')H(k')$$

$\tilde{H}^{(i)}$: equalization desired component with i
$n(K')$: the number of transmission sub-carriers
$W^{(i)}(k')$: equalization weight with k' and i
$H(k')$: channel estimation value with k'.

5. The transmitting/receiving device according to claim 2, wherein the decoding/replica generating unit includes:

a log likelihood ratio calculation unit which calculates a log likelihood ratio of each bit based on the interference cancelled signal outputted from the second time domain converting unit and outputs the calculated log likelihood ratio;

a decoding unit which decodes each bit using the log likelihood ratio outputted from the log likelihood radio calculation unit and outputs the log likelihood ratio of each bit after the decoding; and a symbol replica generating unit which generates a symbol replica based on the log likelihood ratio of each bit after the decoding, outputted from the decoding unit, and outputs the generated symbol replica.

6. The transmitting/receiving device according to claim 2, wherein the transmitting device further includes:

a first serial/parallel converting unit which converts the transmission information bit string to M number of strings and outputs the M number of strings;

the encoding unit encoding the respective signals of the M number of strings outputted from the first serial/parallel converting unit and outputting the encoded signals as code bit strings, and the low-order modulating unit conducting low-order modulation on the respective code bit strings of the M number of strings outputted from the encoding unit and outputting the low-order modulated code bit strings of the M number of strings as low-order modulated signals, the transmitting device further including:

a weight multiplying unit which distributes predetermined power to the low-order modulated signals of the M number of strings outputted from the low-order modulating unit and outputs the power-distributed low-order modulated signals; and a first parallel/serial converting unit which converts the power-distributed low-order modulated signals of the M number of strings outputted from the weight multiplying unit to a single string and outputs the string to the first frequency domain converting unit.

7. The transmitting/receiving device according to claim 6, wherein the decoding/replica generating unit includes:

a second serial/parallel converting unit which serial/parallel-converts the interference cancelled signal outputted from the second time domain converting unit to M number of strings and outputs the M number of strings;

a log likelihood ratio calculation unit which calculates a log likelihood ratio of each of the M number of strings of the interference cancelled signal outputted from the second serial/parallel converting unit and outputs the calculated log likelihood ratio;

a decoding unit which decodes each of the M number of strings of the interference cancelled signal using the log likelihood ratio outputted from the log likelihood radio calculation unit and outputs each of the decoded M number of strings of the interference cancelled signal as a decoded bit string;

a second parallel/serial converting unit which parallel/serial-converts the decoded bit strings of the M number of strings for output;

a symbol replica generating unit which converts each of the decoded bit strings of the M number of strings outputted from the decoding unit to a symbol replica and outputs the symbol replica;

a weight multiplying unit which distributes predetermined power to the symbol replicas of the M number of strings outputted from the symbol replica generating unit and outputs power-distributed signals of the M number of strings; and a third parallel/serial converting unit which parallel/serial-converts the power-distributed signals of the M number of strings outputted from the weight multiplying unit to a single string and outputs the string.

8. The transmitting/receiving device according to claim 6, wherein the receiving device further includes a channel estimation value correcting unit which corrects the channel estimation value outputted from the channel estimation unit and outputs the corrected channel estimation value, the iterative equalization unit equalizes the frequency domain reception signal outputted from the second frequency domain converting unit using the corrected channel estimation value outputted from the channel estimation value correcting unit, iteratively cancels inter-symbol interference from the equalized signal among code strings using the frequency domain symbol replica and outputs M number of interference cancelled signals, the second time domain converting units are provided in the M number, and each of the second time domain converting units is to convert the interference cancelled signal outputted from the iterative equalization unit to a time domain signal, and the third frequency domain converting units are provided in the M number, and each of the third frequency domain converting units is to convert the symbol replica outputted from the decoding/replica generating unit to a frequency domain signal and output the frequency domain signal of the symbol replica to the iterative equalization unit.

9. The transmitting/receiving device according to claim 8, wherein the channel estimation value correcting unit generates the corrected channel estimation value with code string "m" and sub-carrier "k" to meet the following equation, while the code string is being defined as "m" (m=1, 2, ..., M (M is an integer greater than or equal to two, and indicates the number of code strings)) and the sub-carrier is being defined as "k" (k=1, 2, ..., K (K is an integer greater than or equal to two, and indicates the number of sub-carriers))

$$\hat{H}_m(k) = \begin{cases} H(k)A_m e^{-j2\pi\frac{k(m-1)}{KM}} & \ldots\ k \leq \frac{K}{2}, m > 1 \\ H(k)A_m e^{-j2\pi\frac{k(m-1)}{KM}} e^{j2\pi\frac{m-1}{M}} & \ldots\ k > \frac{K}{2}, m > 1 \end{cases}$$

$\hat{H}_m(k)$: corrected channel estimation value with m and k
$A_m$: power weight of code sting
$H(k)$: channel estimation value with k.

10. The transmitting/receiving device according to claim 8, wherein the iterative equalization unit includes:

an inter-code string interference replica generating unit which generates an inter-code string interference replica based on the symbol replica outputted from the third frequency domain conversion unit and the corrected channel estimation value outputted from the channel estimation value correcting unit and outputs the inter-code string interference replica;

an inter-code string interference cancellation unit which subtracts the inter-code string interference replica outputted from the inter-code string interference replica generating unit from the frequency domain reception signal outputted from the second frequency domain converting unit, and outputs the result as the inter-code string interference cancelled signal;

an equalization weight calculation unit which calculates an equalization weight using the corrected channel estimation value outputted from the channel estimation value correcting unit and outputs the calculated equalization weight;

a post-equalization channel gain generating unit which calculates a post-equalization channel gain using the equalization weight outputted from the equalization weight calculation unit and the corrected channel estimation value outputted from the channel estimation value correcting unit, and outputs the calculated post-equalization channel gain;

an equalization filter which equalizes the inter-code string interference cancelled signal outputted from the inter-code string interference cancellation unit based on the equalization weight outputted from the equalization weight calculation unit;

an equalization desired component generating unit which generates an equalization desired component based on the post-equalization channel gain outputted from the post-equalization channel gain generating unit and outputs the equalization desired component;

a residual multipath interference replica generating unit which generates a residual multipath interference replica using the post-equalization channel gain outputted from the post-equalization channel gain generating unit, the equalization desired component outputted from the equalization desired component generating unit and the symbol replica outputted from the third frequency domain converting unit, and outputs the generated residual multipath interference replica; and a residual multipath interference cancellation unit which cancels the residual multipath interference replica outputted from the residual multipath interference replica generating unit from the equalized signal outputted from the equalization filter, and outputs the equalized signal with the residual multipath interference replica being cancelled as the interference cancelled signal.

11. The transmitting/receiving device according to claim 10, wherein the iterative equalization unit generates the inter-code string interference cancelled signal with sub-carrier "k" and iteration count "i" to meet the following equation, while code string is being defined as "m" (m=1, 2, ..., M (M is an integer greater than or equal to two, and indicates the number of code strings)), the sub-carrier is being defined as "k" (k=1, 2, ..., K (K is an integer greater than or equal to two, and indicates the number of sub-carriers)) and the iteration count is being defined as "i" (i=1, 2, ... )

$$\overline{R}_m^{(i)}(k) = R(k) - \sum_{m'=1, m' \neq m}^{M} \hat{H}_{m'}(k) \hat{S}_{m'}^{(i-1)}(k)$$

$\overline{R}_m^{(i)}(k)$: inter-code string interference cancelled signal with m, k and i R(k): reception signal with k $\hat{H}_{m'}(k)$: corrected channel estimation value with m' and k $\hat{S}_{m'}^{(i-1)}(k)$: symbol replica with m', k and i−1.

12. The transmitting/receiving device according to claim 10, wherein the iterative equalization unit generates the equalized signal, after the interference is cancelled, with code string "m", sub-carrier "k" and iteration count "i" to meet the following equation, while the code string is being defined as "m" (m=1, 2, ..., M (M is an integer greater than or equal to two, and indicates the number of code strings)), the sub-carrier is being defined as "k" (k=1, 2, ..., K (K is an integer greater than or equal to two, and indicates the number of sub-carriers)) and the iteration count is being defined as "i" (i=1, 2, ... )

$$\hat{R}_m^{(i)}(k) = W_m^{(i)}(k)\overline{R}_m^{(i)}(k) - \left(W_m^{(i)}(k)\hat{H}_m(k) - \tilde{H}_m^{(i)}\right)\hat{S}_m^{(i-1)}(k)$$

$$\tilde{H}_m^{(i)} = \frac{1}{K}\sum_{k=1}^{K} W_m^{(i)}(k)\hat{H}_m(k)$$

$\hat{R}_m^{(i)}(k)$: equalized signal, after interference being cancelled, with m, k and i $W_m^{(i)}(k)$: equalization weight, considering residual interference power, with m, k and i $\overline{R}_m^{u(i)}(k)$: inter-code string interference cancelled signal with m, k and i $\hat{H}_m(k)$: corrected channel estimation value with m and k $\tilde{H}_m^{(i)}$: equalization desired component with m and i $\hat{S}_m^{(i-1)}(k)$: symbol replica with m, k and i−1.

13. The transmitting/receiving device according to claim 8, wherein the decoding/replica generating unit includes:

M number of log likelihood ratio calculation units, each of which calculates a log likelihood ratio of each bit based on the interference cancelled signal outputted from the second time domain converting unit, and outputs the calculated log likelihood ratio;

M number of decoding units, each of which decodes each bit using the log likelihood ratio outputted from the log likelihood radio calculation unit, and outputs the decoded bit as a bit string;

M number of symbol replica generating units, each of which generates a symbol replica based on the bit string outputted from the decoding unit, and outputs the generated symbol replica; and a second parallel/serial converting unit which converts the bit strings of the M number of strings outputted from the decoding units to a signal of a single string and outputs the converted signal.

14. A transmitting method of transmitting a single-carrier signal, comprising:

encoding a transmission information bit string, conducting low-order modulation on the encoded bit string and outputting the encoded and modulated transmission information bit string as a frequency spectrum; and transmitting a partial spectrum that is a central 1/M portion (M is an integer greater than or equal to two) of the Nyquist band-limited frequency spectrum outputted as a result of the encoding and the low-order modulation, wherein, the transmission information bit string is to be serial/parallel-converted to M number of strings, the transmission information bit strings are encoded, low-order modulation is conducted, and the predetermined power is distributed among the M number of strings, and the power distributed signals of the M number of strings are to be parallel/serial-converted to a single string to be outputted as the frequency spectrum.

15. A transmitting method of transmitting a single-carrier signal, comprising:

encoding a transmission information bit string and outputting the encoded transmission information bit string as a code bit string;

conducting low-order modulation on the code bit string outputted as a result of the encoding and outputting the low-order modulated code bit string as a low-order modulated signal;

conducting first frequency domain conversion by which the low-order modulated signal outputted as a result of the low-order modulation is converted to a frequency domain signal and outputted as a frequency spectrum;

conducting partial spectrum selection by which a central 1/M portion (M is an integer greater than or equal to two) of the frequency spectrum outputted as a result of the first frequency domain conversion is selected and outputted as a spectrum selected signal;

conducting first time domain conversion by which the spectrum selected signal outputted as a result of the partial spectrum selection is converted to a time domain signal and outputted as a transmission signal;

conducting first serial/parallel conversion by which the transmission information bit string is converted to M number of strings and outputted, wherein:

in the encoding, the respective signals of the M number of strings outputted as a result of the first serial/parallel conversion are encoded and outputted as code bit strings, and in the low-order modulation, low-order modulation is conducted on the respective code bit strings of the M number of strings outputted as a result of the encoding by which the low-order modulated code bit strings of the M number of strings are outputted as low-order modulated signals, the transmitting method further comprising:

conducting weight multiplication by which predetermined power is distributed to the low-order modulated signals of the M number of strings outputted as a result of the low-order modulation, and the power-distributed signals are outputted; and conducting first parallel/serial conversion by which the power-distributed signals of the M number of strings outputted as a result of the weight multiplication are converted to a single string and outputted for the first frequency domain conversion.

16. A transmitting/receiving method of transmitting a single-carrier signal, comprising:

in transmission, encoding a transmission information bit string, conducting low-order modulation on the encoded bit string and outputting the encoded and modulated transmission information bit string as a frequency spectrum, and transmitting a selected partial spectrum that is a central 1/M portion (M is an integer greater than or equal to two) of the Nyquist band-limited frequency spectrum outputted as a result of the encoding and the low-order modulation; and in reception, conducting iterative equalization on the reception signal, outputted as a result of the partial spectrum selection, by liner filtering and inter-symbol interference cancellation using a replica after decoding, wherein, the transmission information bit string is to be serial/parallel-converted to M number of strings, the transmission information bit strings are encoded, low-order modulation is conducted, and the predetermined power is distributed among the M number of strings, and the power distributed signals of the M number of strings are to be parallel/serial-converted to a single string to be outputted as the frequency spectrum.

17. A transmitting/receiving method of transmitting a single-carrier signal, comprising:

in transmission, encoding a transmission information bit string and outputting the encoded transmission information bit string as a code bit string, conducting low-order modulation on the code bit string outputted as a result of the encoding and outputting the low-order modulated code bit string as a low-order modulated signal, conducting first frequency domain conversion by which the low-order modulated signal outputted as a result of the low-order modulation is converted to a frequency domain signal and outputted as a frequency spectrum, conducting partial spectrum selection by which a central 1/M portion (M is an integer greater than or equal to two) of the frequency spectrum outputted as a result of the first frequency domain conversion is selected and outputted as a spectrum selected signal, and conducting first time domain conversion by which the spectrum selected signal outputted as a result of the partial spectrum selection is converted to a time domain signal and outputted as a transmission signal; and in reception, conducting second frequency domain conversion by which a reception signal is converted to a frequency domain signal and outputted as a reception signal including a reference reception signal, conducting channel estimation on the basis of the frequency domain reference reception signal outputted as a result of the second frequency domain conversion and outputting a channel estimation value, conducting iterative equalization by which the frequency domain reception signal outputted as a result of the second frequency domain conversion is equalized using the channel estimation value outputted as a result of the channel estimation, by which inter-symbol interference is iteratively cancelled from the equalized signal using a frequency domain symbol replica and the equalized signal with the inter-symbol interference that is cancelled is outputted as an interference cancelled signal, conducting second time domain conversion by which the interference cancelled signal outputted as a result of the iterative equalization is converted to a time domain interference cancelled signal and outputted, conducting decoding/replica generation by which the time domain interference cancelled signal outputted as a result of the second time domain conversion is decoded, a symbol replica is generated based on the decoding result and the generated symbol replica is outputted, conducing third frequency domain conversion by which the symbol replica outputted as a result of the decoding/replica generation is converted to a frequency domain signal and outputted for iterative equalization, in transmission, conducting first serial/parallel conversion by which the transmission information bit string is converted to M number of strings and outputted, wherein, in the encoding, the respective signals of the M number of strings outputted as a result of the first serial/parallel conversion are encoded and outputted as code bit strings, and the low-order modulation is conducted on the respective code bit strings of the M number of strings outputted as a result of the encoding by which the low-order modulated code bit strings of the M number of strings are outputted as low-order modulated signals, the transmitting/receiving method further comprising:

in transmission, wherein conducting weight multiplication by which predetermined power is distributed to the low-order modulated signals of the M number of strings outputted as a result of the low-order modulation, and the power-distributed low-order modulated signals are outputted; and conducting first parallel/serial conversion by which the power-distributed low-order modulated signals of the M number of strings that are outputted as a result of the weight multiplication are converted to a single string and outputted for the first frequency domain conversion.

18. The transmitting/receiving method according to claim 17, further comprising:

in reception, conducting channel estimation value correction by which the channel estimation value outputted as a result of the channel estimation is corrected and outputted as a corrected channel estimation value; wherein, in the iterative equalization, the frequency domain reception signal outputted as a result of the second frequency domain conversion is equalized using the corrected channel estimation value outputted as a result of the channel estimation value correction, inter-symbol interference is iteratively cancelled from the equalized signal among code strings using a frequency domain symbol replica and M number of interference cancelled signals are outputted, in the second time domain conversion, the respective M number of interference cancelled signals outputted as a result of the iterative equalization are converted to time domain interference cancelled signals, and in the third frequency domain conversion, the M number of symbol replicas outputted as a result of the decoding/replica generation are converted to frequency domain signals and outputted for iterative equalization.

\* \* \* \* \*